(12) United States Patent
Tonegawa et al.

(10) Patent No.: US 8,063,605 B2
(45) Date of Patent: Nov. 22, 2011

(54) CHARGING DEVICE FOR AN ELECTRIC VEHICLE, ELECTRIC VEHICLE EQUIPPED WITH THE CHARGING DEVICE AND CONTROL METHOD FOR CHARGING AN ELECTRIC VEHICLE

(75) Inventors: Hiromi Tonegawa, Kounan (JP); Masato Ichishi, Kusagai (JP); Hichirosai Oyobe, Toyota (JP); Makoto Nakamura, Okazaki (JP); Tetsuhiro Ishikawa, Toyota (JP); Yoshinori Fujitake, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 816 days.

(21) Appl. No.: 12/085,666

(22) PCT Filed: Dec. 5, 2006

(86) PCT No.: PCT/IB2006/003470
§ 371 (c)(1),
(2), (4) Date: May 29, 2008

(87) PCT Pub. No.: WO2007/066198
PCT Pub. Date: Jun. 14, 2007

(65) Prior Publication Data
US 2009/0096416 A1    Apr. 16, 2009

(30) Foreign Application Priority Data

Dec. 6, 2005   (JP) .................................. 2005-351896
Nov. 6, 2006   (JP) .................................. 2006-300674

(51) Int. Cl.
*H01M 10/44*    (2006.01)
*H01M 10/46*    (2006.01)

(52) U.S. Cl. ........................................................ 320/107
(58) Field of Classification Search .................. 320/104, 320/107, 108, 115, 128
See application file for complete search history.

(56) References Cited

U.S. PATENT DOCUMENTS

| 4,609,328 A * | 9/1986 | Cirrito .............................. 417/55 |
| 2003/0120442 A1 | 6/2003 | Pellegrino et al. |
| 2004/0165969 A1 * | 8/2004 | Silverbrook ....................... 412/9 |

(Continued)

FOREIGN PATENT DOCUMENTS

GB        2 352 886 A       2/2001

(Continued)

OTHER PUBLICATIONS

Japanese Office Action in Japanese Patent Application No. 2006-300674; dated Sep. 7, 2010 (with English-language translation).

(Continued)

*Primary Examiner* — Edward Tso
(74) *Attorney, Agent, or Firm* — Oliff & Berridge, PLC

(57) ABSTRACT

An HV-ECU acquires electric power information from an electricity transmission line by using a modem. The electric power information includes information regarding the amount of carbon dioxide having been emitted in the generating process of the commercial electric power supplied from an electricity transmission line. When the $CO_2$ emission amount is below a pre-set $CO_2$ emission amount, the HV-ECU inputs the commercial electric power, and outputs a command to charge an electricity storage device to a motive power output device, so that the motive power output device executes a charging control of the electricity storage device.

17 Claims, 15 Drawing Sheets

U.S. PATENT DOCUMENTS

2006/0016689 A1* 1/2006 Carson et al. .................. 205/43
2010/0038156 A1* 2/2010 Fujitake et al. ............ 180/65.22

FOREIGN PATENT DOCUMENTS

| JP | A 08-154307 | 6/1996 |
| JP | A 11-178237 | 7/1999 |
| JP | A 2001-078304 | 3/2001 |
| JP | A 2002-366615 | 12/2002 |
| JP | A-2005-245185 | 9/2005 |

OTHER PUBLICATIONS

Markel T. et al., "Energy Storage Systems Considerations for Grid-Charged Hybrid Electric Vehicles," pp. 344-349, 2005, IEEE.

* cited by examiner

CHARGING DEVICE FOR AN ELECTRIC VEHICLE, ELECTRIC VEHICLE EQUIPPED WITH THE CHARGING DEVICE AND CONTROL METHOD FOR CHARGING AN ELECTRIC VEHICLE

FIELD OF THE INVENTION

The invention relates to a charging device, a mobile object equipped with the charging device, an electric vehicle equipped with the charging device, a charging control method, and a charging control method of an electric vehicle. More particularly, the invention relates to a charging device charged from a commercial electric power source, a mobile object equipped with the charging device, an electric vehicle equipped with the charging device, a charging control method, and a charging control method or an electric vehicle.

BACKGROUND OF THE INVENTION

In recent years, electric vehicles, hybrid vehicles, etc. in which an electricity storage device, such as a battery, a capacitor, etc., and an inverter, and a motor driven by the inverter are mounted as motive power sources, are drawing attention as environment-friendly motor vehicles.

A hybrid vehicle equipped with an external charging function of charging the battery through the use of an external electric power source is known. According to the hybrid vehicle equipped with the external charging function, if the battery can be charged, for example, from the household commercial electric power source, various merits will be achieved, including improved fuel economy, reduced frequency of going to petrol stations for refueling, etc.

Japanese Patent Application Publication No. JP-A-8-154307 discloses such an external charging function-equipped hybrid vehicle. This hybrid vehicle includes a battery chargeable by an external charger, an electric motor that drives wheels by electric power from the battery, the control means for controlling the working of the electric motor, an internal combustion engine that is directly or indirectly used to drive the vehicle, and traveling time-related amount calculation means for calculating an amount related to the traveling time after the battery has been charged by the external charger. The control means restricts the output of the electric motor if the traveling time-related amount calculated by the traveling time-related amount calculation means reaches a predetermined amount.

In this hybrid vehicle, if the vehicle travels for a long time without external charging, the output of the electric motor is restricted. If inevitably the travel is continued while the internal combustion engine consumes fuel, the output of the electric motor is restricted, so that the driver is urged to perform the external charging. Therefore, according to this hybrid vehicle, the degree of dependence on the internal combustion engine can be reduced.

A hybrid vehicle disclosed in Japanese Patent Application Publication No. JP-A-8-154307 is a vehicle that reduces the degree of dependence on the internal combustion engine, that is, a vehicle that actively uses the electric power (commercial electric power) supplied from an external electric power source (generally, a commercial electric power source) as a power source. However, in the generation of commercial electric power, a large amount of carbon dioxide is generated in the fire power generation in which electric power is generated by burning petroleum, a gas, etc. Therefore, for true contribution to environmental protection, there is a need for considering the generating process of electric power as well.

In order to cope with fluctuations in the demand for electric power depending on the season and the time of day, or the like, the power generation by electric power companies is carried out by a plurality of electric power generation methods such as the fire power generation, the atomic power generation, the hydraulic power generation, etc. The emission amount of carbon dioxide per unit electric power varies depending on the electric power generation methods. As stated above, the emission amount of carbon dioxide is particularly large in the fire power generation. Therefore, in an electric vehicle equipped with an external charging function that is capable of charging the battery from a commercial electric power source, if merely the amount of charging from the commercial electric power source is increased, there is a possibility of insufficient contribution to environmental protection.

SUMMARY OF THE INVENTION

It is an object of the invention to provide a charging device that can contribute to environmental protection in terms inclusive of the generating process of the commercial electric power used for the charging, a mobile object equipped with the charging device, an electric vehicle equipped with the charging device, a charging control method, and a charging control method of an electric vehicle.

A first aspect of the invention relates to a charging device that includes an electric power input portion that receives a commercial electric power supplied from a commercial electric power source. This charging device includes: an electric power supply portion that supplies the commercial electric power input from the electric power input portion to an electricity storage device after converting the commercial electric power into such a state as to be able to charge the electricity storage device; and a control portion that controls charging of the electricity storage device by the electric power supply portion on a basis of information regarding an amount of carbon dioxide having been emitted in generating the commercial electric power.

In the charging device, the control portion controls the charging of the electricity storage device on the basis of the information regarding the amount of carbon dioxide having been emitted in generating the commercial electric power. Therefore, the charging device can judge whether or not it is appropriate to charge the electricity storage device, taking into consideration the amount of carbon dioxide having been emitted in the generating process of the commercial electric power that is presently supplied.

Therefore, according to this aspect, a charging device that can contribute to environmental protection in terms inclusive of the generating process of the commercial electric power used for the charging can be realized.

The charging device may further include a reception portion that receives the information regarding the amount of carbon dioxide which is transmitted via an electricity transmission line that transmits the commercial electric power.

As for the charging device, the information regarding the amount of carbon dioxide is output to the electricity transmission line that transmits the commercial electric power, for example, from a server of an electric power company or the like. Since the reception portion receives the information regarding the amount of carbon dioxide transmitted via the electricity transmission line, there is no need to separately provide a communication medium for exchanging the information regarding the amount of carbon dioxide. Therefore, according to this charging device, costs can be reduced.

The information may include the amount of carbon dioxide having been emitted in generating the commercial electric power. The control portion, when the amount of carbon dioxide included in the information is below a pre-set threshold value, may output a command to charge the electricity storage device to the voltage conversion portion.

In this charging device, the electricity storage device is charged by the voltage conversion portion only when the amount of carbon dioxide having been emitted in generating the commercial electric power is below the pre-set threshold value. Therefore, according to this charging device, it is possible to use, for the changing, only clean electric power with small emission amount of carbon dioxide in the electric power generating process. In consequence, it is possible to contribute to reduction of the emission amount of carbon dioxide.

Furthermore, the aforementioned information may include a proportion accounted for by an electric power generated by a fire power generation in the commercial electric power. The control portion, when the proportion is below a pre-set threshold value, may output a command to charge the electricity storage device to the voltage conversion portion.

In the fire power generation in which electric power is generated by burning petroleum, a gas, etc., a large amount of carbon dioxide is generated. In this charging device, the electricity storage device is charged by the voltage conversion portion only when the proportion accounted for by the electric power generated by the fire power generation in the commercial electric power is below the pre-set threshold value. Therefore, according to this charging device, too, it is possible to use, for the charging, only clean electric power with small emission amount of carbon dioxide in the electric power generating process. In consequence, it is possible to contribute to reduction of the emission amount of carbon dioxide.

A second aspect of the invention relates to an electric vehicle that includes: a chargeable-dischargeable electricity storage device; an electric motor that generates a driving power of the vehicle by using an electric power from the electricity storage device; and an electric power input portion that receives a commercial electric power supplied from a commercial electric power source. This electric vehicle includes: an electric power supply portion that supplies the commercial electric power from the electric power input portion to the electricity storage device after converting the commercial electric power into such a state as to be able to charge the electricity storage device; and a control portion that controls charging of the electricity storage device by the electric power supply portion on a basis of information regarding an amount of carbon dioxide having been emitted in generating the commercial electric power.

In the electric vehicle according to this aspect, the electricity storage device can be charged with the commercial electric power input from the electric power input portion. Since the control portion controls the charging of the electricity storage device on the basis of the information regarding the amount of carbon dioxide having been emitted in generating the commercial electric power, the charging device can judge whether or not to charge the electricity storage device, taking into consideration the amount of carbon dioxide having been emitted in the generating process of the commercial electric power that is presently supplied.

Therefore, according to this aspect, an electric vehicle that can contribute to environmental protection in terms inclusive of the generating process of the commercial electric power used for the charging can be realized.

The electric vehicle may further include an internal combustion engine that operates as a motive power source of the vehicle. The control portion may calculate an amount of carbon dioxide that the internal combustion engine emits.

In the electric vehicle, an internal combustion engine is mounted as a motive power source of the motor vehicle. Since the control portion calculates the amount of carbon dioxide that the internal combustion engine emits, a sum total of the amount of carbon dioxide having been emitted in the generating process of the electric power that is stored in the electricity storage device and the amount of carbon dioxide having been emitted from the internal combustion engine can be calculated. Therefore, according to this electric vehicle, the amount of carbon dioxide having been emitted in obtaining a driving power of the motor vehicle can be accurately evaluated.

The electric vehicle further includes a storage portion that stores the information regarding the amount of carbon dioxide. The control portion may further calculate a total emission amount of carbon dioxide on the basis of the information regarding the amount of carbon dioxide stored in the storage portion.

Therefore, according to this electric vehicle, the degree of contribution of the electric vehicle to the environment can be evaluated by evaluating the total emission amount of carbon dioxide.

In short, according to this aspect, since the charging of the electricity storage device by the voltage conversion portion is controlled on the basis of the information regarding the amount of carbon dioxide having been emitted in generating commercial electric power, it is possible to contribute to environmental protection in an all-aspect fashion inclusive of the generating process of the commercial electric power used for the charging.

In the electric vehicle of the second aspect, the control portion may further calculate a first amount of carbon dioxide having been emitted in obtaining a vehicle driving power by the electric motor on a basis of an electric power consumption amount of the electric motor and a basic unit that represents the amount of carbon dioxide having been emitted in generating a unit amount of the electric power stored in the electricity storage device.

Hence, according to this construction, even in the electric vehicle in which the electric motor generates the driving power of the vehicle by using the electric power from the electricity storage device, the emission amount of carbon dioxide associated with the running of the vehicle can be evaluated.

The electric vehicle of the second aspect may further include an internal combustion engine that operates as a motive power source of the vehicle, and the control portion may further calculate a second amount of carbon dioxide that the internal combustion engine emits, and may calculate a total emission amount of carbon dioxide by adding the calculated second amount of carbon dioxide to the first amount of carbon dioxide.

Hence, according to this construction, it is possible to accurately evaluate the total emission amount of carbon dioxide having been needed in obtaining the driving power of the electric vehicle.

The electric vehicle of the second aspect may further include a communication device constructed so as to be able to communicate with an external device or the like outside the vehicle via the electric power input portion. When the electricity storage device is charged from the commercial electric power source, the communication device receives information regarding the amount of carbon dioxide transmitted from the external device or the like outside the vehicle via the electric power input portion, and transmits the total emission amount of carbon dioxide calculated by the control portion to the external device or the like outside the vehicle via the electric power input portion.

Hence, according to this construction, when the electricity storage device is charged from commercial electric power source, the communication device transmits the total emission amount of carbon dioxide calculated by the control portion to the external device or the like outside the vehicle via the electric power input portion. Therefore, the calculated total emission amount of carbon dioxide becomes available outside the vehicle. Hence, according to this construction, the total emission amount of carbon dioxide associated with the running of the motor vehicle can be managed on a server, a terminal device or the like outside the motor vehicle, and can be collected in a server on the Internet for competition with other people (vehicles), or the like. In consequence, further improvement of the users' environmental conservation awareness can be expected. Besides, according to this construction, since there is no need to separately provide a communication medium for exchanging information regarding carbon dioxide and data of the total emission amount of carbon dioxide with an external device or the like outside the motor vehicle, cost increase can be curbed.

The electric vehicle of the second aspect may further include a indicating portion that indicates the total emission amount of carbon dioxide calculated by the control portion.

In this construction, the total emission amount of carbon dioxide associated with the running of the vehicle is presented to the driver. Hence, according to this construction, it is possible to motivate the user to drive in such a fashion as to curb the $CO_2$ emission amount.

A third aspect of the invention relates to a charging control method that includes: judging whether or not it is appropriate to charge an electricity storage device with commercial electric power on a basis of information regarding an amount of carbon dioxide having been emitted in generating the commercial electric power; and converting the commercial electric power into such a state as to be able to charge the electricity storage device, when it is judged that it is appropriate to charge the electricity storage device with the commercial electric power.

A fourth aspect of the invention relates to a charging control method of an electric vehicle that includes an electric motor that generates a driving power of the vehicle by using an electric power from a chargeable-rechargeable electricity storage device. In this charging control method, it is judged whether or not it is appropriate to charge the electricity storage device with commercial electric power on a basis of information regarding an amount of carbon dioxide having been emitted in generating the commercial electric power. When it is judged that it is appropriate to charge the electricity storage device with the commercial electric power, the commercial electric power is converted into such a state as to be able to charge the electricity storage device.

A fifth aspect of the invention relates to a charging device that includes: an electric power input portion that receives a commercial electric power supplied from a commercial electric power source; an electric power supply portion that supplies the commercial electric power input from the electric power input portion to an electricity storage device after converting the commercial electric power into such a state as to be able to charge the electricity storage device; and a control portion that controls charging of the electricity storage device by the electric power supply portion on a basis of information regarding an amount of carbon dioxide having been emitted in generating the commercial electric power.

A sixth aspect of the invention relates to an electric vehicle that includes: a chargeable-dischargeable electricity storage device; an electric motor that generates a driving power of the vehicle by using an electric power from the electricity storage device; an electric power input portion that receives a commercial electric power from a commercial electric power source; a voltage conversion portion constructed so as to be able to convert the commercial electric power input from the electric power input portion to a voltage level of the electricity storage device and charge the electricity storage device; and a control portion that controls charging of the electricity storage device by the electric power supply portion on a basis of information regarding an amount of carbon dioxide having been emitted in generating the commercial electric power.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
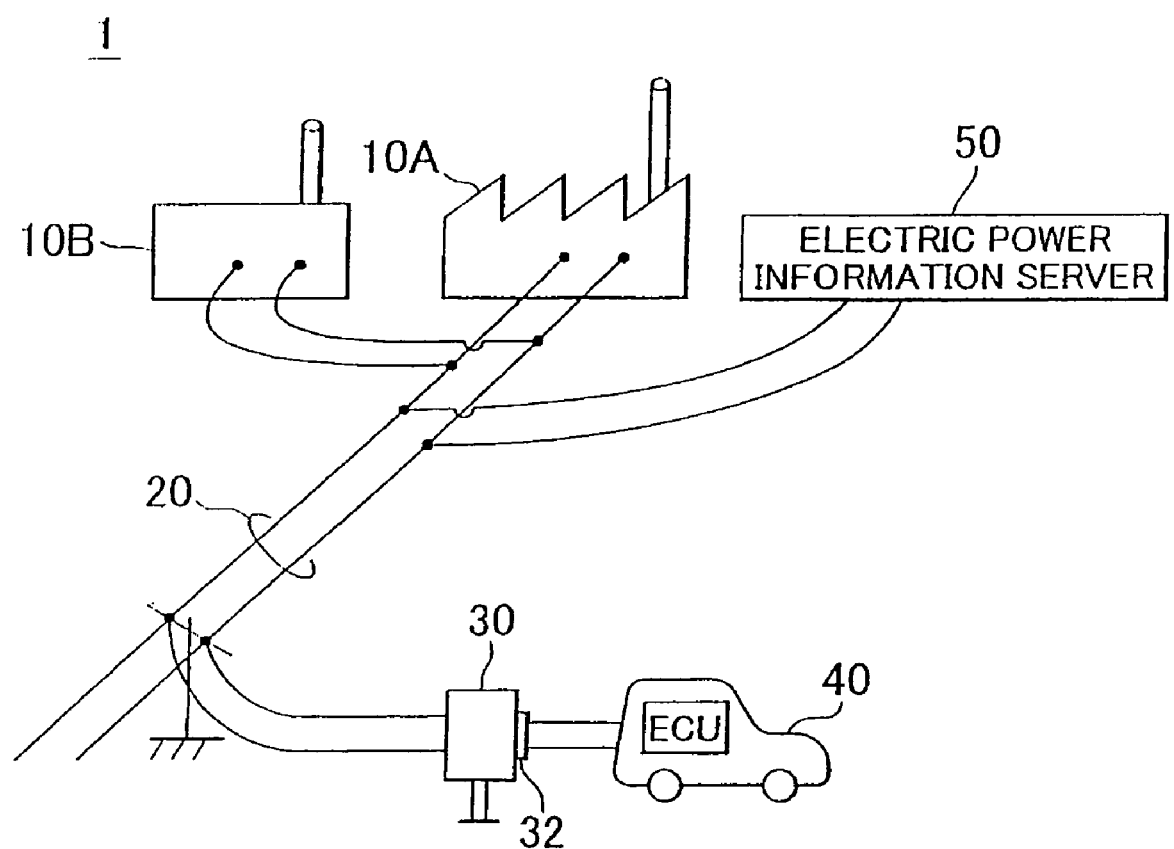
FIG. 1 is a schematic diagram of an electric power system that includes an electric vehicle according to a first embodiment of this invention.

Embodiments of the invention will be described in detail hereinafter with reference to the drawings. The same or comparable portions in the drawings are denoted by the same reference characters, and the description thereof will not be repeated.

FIG. 1 is a schematic diagram of an electric power system that includes an electric vehicle according to the first embodiment of this invention. Referring to FIG. 1, an electric power system 1 includes power plants 10A, 10B, an electricity transmission line 20, a charging station 30, an electric vehicle 40, and an electric power information server 50.

The power plants 10A, 10B generate commercial electric power, and supply the generated commercial electric power to the electricity transmission line 20. Incidentally, other power plants (not shown) are also connected to the electricity transmission line 20. Such power plants include, for example, fire power plants that generate electric power by burning petroleum, a gas, etc., atomic power plants, hydraulic power plants, etc. The charging station 30 is connected to the electricity transmission line 20. The charging station 30 is a facility for charging the electric vehicle 40 with commercial electric power supplied from the electricity transmission line 20. For example, a dwelling house may be used as the charging station 30.

The electric vehicle 40 is a hybrid vehicle in which a motor that generates driving power by using electric power as an energy source, and an engine that generates driving power by using a fuel as an energy source are mounted as motive power sources. The electric vehicle 40 is capable of charging an electricity storage device (not shown) that stores electric power by connecting a charge plug to an electric outlet 32 of the charging station 30.

Besides, the electric vehicle 40 acquires information regarding electric power (hereinafter, referred to as "electric power information") from the electric power information server 50 connected to the electricity transmission line 20, via the electricity transmission line 20 and the charging station 30. The electric power information includes information regarding the amount of carbon dioxide having been emitted in generating commercial electric power transmitted via the electricity transmission line 20 (e.g., the amount of carbon dioxide having been emitted in generating 1 kwh of commercial electric power, and hereinafter referred to as "$CO_2$ emission amount"). Then, the electric vehicle 40 charges the electricity storage device by inputting commercial electric power from the charging station 30 only when the $CO_2$ emission amount included in the electric power information acquired from the electric power information server 50 is below a pre-set threshold value.

The electric power information server 50 is connected to the electricity transmission line 20. The electric power information server 50 creates electric power information that includes the $CO_2$ emission amount, and outputs the created electric power information to the electricity transmission line 20 through the use of a modem (not shown) or the like. Incidentally, the $CO_2$ emission amount can be calculated, for example, by multiplying the proportions accounted for by the electric power generation methods (the fire power generation, the atomic power generation, etc.) in the commercial electric power supplied to the electricity transmission line 20, by the amounts of emission of carbon dioxide corresponding to the individual electric power generation methods, and by taking a total sum thereof, or the like. In general, the emission amount of carbon dioxide from the fire power generation is larger than the other electric power generation methods, so that if the percentage of the power generation amount provided by the fire power generation is high, the $CO_2$ emission amount is also large.

Figure 2:
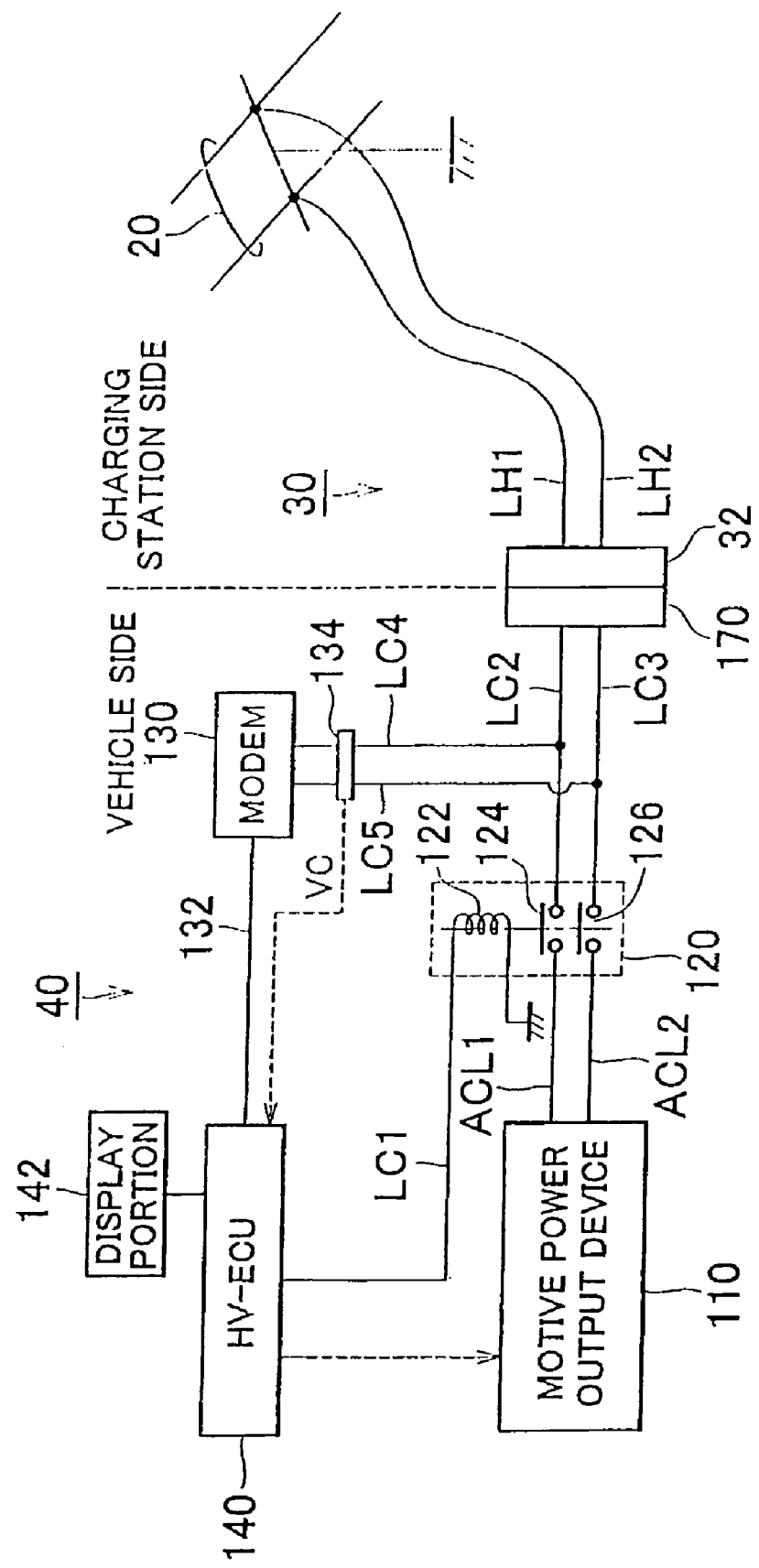
FIG. 2 is a diagram of the electric vehicle shown in FIG. 1.

FIG. 2 is an overall block diagram of the electric vehicle 40 shown in FIG. 1. Referring to FIG. 2, the electric vehicle 40 includes a motive power output device 110, a relay circuit 120, a modem 130, a communication cable 132, a voltage sensor 134, an HV-ECU (Electronic Control Unit) 140, a display portion 142, a charge plug 170, electric power input lines ACL1, ACL2, and electric power lines LC1 to LC5.

The motive power output device 110 is connected to the electric power input lines ACL1, ACL2. The relay circuit 120 is made up of an electromagnetic coil 122 and switches 124, 126. The electromagnetic coil 122 is connected between the electric power line LC1 and a ground node. The switch 124 is connected between the electric power input line ACL1 and the electric power line LC2. The switch 126 is connected between the electric power input line ACL2 and the electric power line LC3.

The modem 130 is connected to the electric power lines LC2, LC3 via electric power lines LC4, LC5, respectively. Besides, the modem 130 is connected to the HV-ECU 140 via the communication cable 132. The HV-ECU 140 is connected to the electric power line LC1. The electric power lines LC2, LC3 are connected, via the charge plug 170 and the electric outlet 32 of the charging station 30, to charge station 30-side electric power lines LH1, LH2, respectively, that are connected to the electricity transmission line 20.

The motive power output device 110 outputs driving power in the electric vehicle 40. Besides, the motive power output device 110 converts commercial electric power received from the electric power input lines ACL1, ACL2 into direct-current electric power to charge the electricity storage device (not shown), on the basis of a command from the HV-ECU 140. The construction of the motive power output device 110 will be described later.

The electromagnetic coil 122 of the relay circuit 120 generates magnetic force that acts on the switches 124, 126, when current flows therethrough from the HV-ECU 140 via the electric power line LC1. The switches 124, 126 operate due to the effect of magnetic force from the electromagnetic coil 122. Concretely, the switches 124, 126 turn on when current flows through the electromagnetic coil 122, and they turn off when current does not flow through the electromagnetic coil 122.

The modem 130 receives electric power information from the electric power information server 50 (not shown) via the electricity transmission line 20, the electric power lines LH1, LH2, the electric outlet 32, the charge plug 170, the electric power lines LC2, LC3, and the electric power lines LC4, LC5, and transmits the received electric power information to the HV-ECU 140 via the communication cable 132. The voltage sensor 134 detects the voltage of the electric power lines LC4, LC5, that is, the voltage VC of the commercial electric power supplied from the electricity transmission line 20, and outputs the detected voltage VC to the HV-ECU 140.

The HV-ECU 140 checks whether or not the charge plug 170 is connected to the electric outlet 32 of the charging station 30, on the basis of the presence/absence of the voltage VC from the voltage sensor 134. When the charge plug 170 is not connected to the electric outlet 32 and the vehicle can run, the HV-ECU 140 generates a torque designation for a motor-generator (not shown) that is included in the motive power output device 110, and outputs the generated torque designation to the motive power output device 110.

Besides, when the charge plug 170 is connected to the electric outlet 32, the HV-ECU 140 receives, via the communication cable 132, the electric power information received by the modem 130 from the electric power information server 50. Then, if the $CO_2$ emission amount included in the received electric power information is below the pre-set threshold value, the HV-ECU 140 supplies current to the electric power line LC1 to turn on the relay circuit 120, and outputs to the motive power output device 110 a command for the motive power output device 110 to charge the electricity storage device by inputting commercial electric power from the electric power input lines ACL1, ACL2.

Furthermore, the HV-ECU 140 outputs the $CO_2$ emission amount included in the received electric power information to the display portion 142. The display portion 142 displays the $CO_2$ emission amount received from the HV-ECU 140, for a user of the electric vehicle 40.

Figure 3:
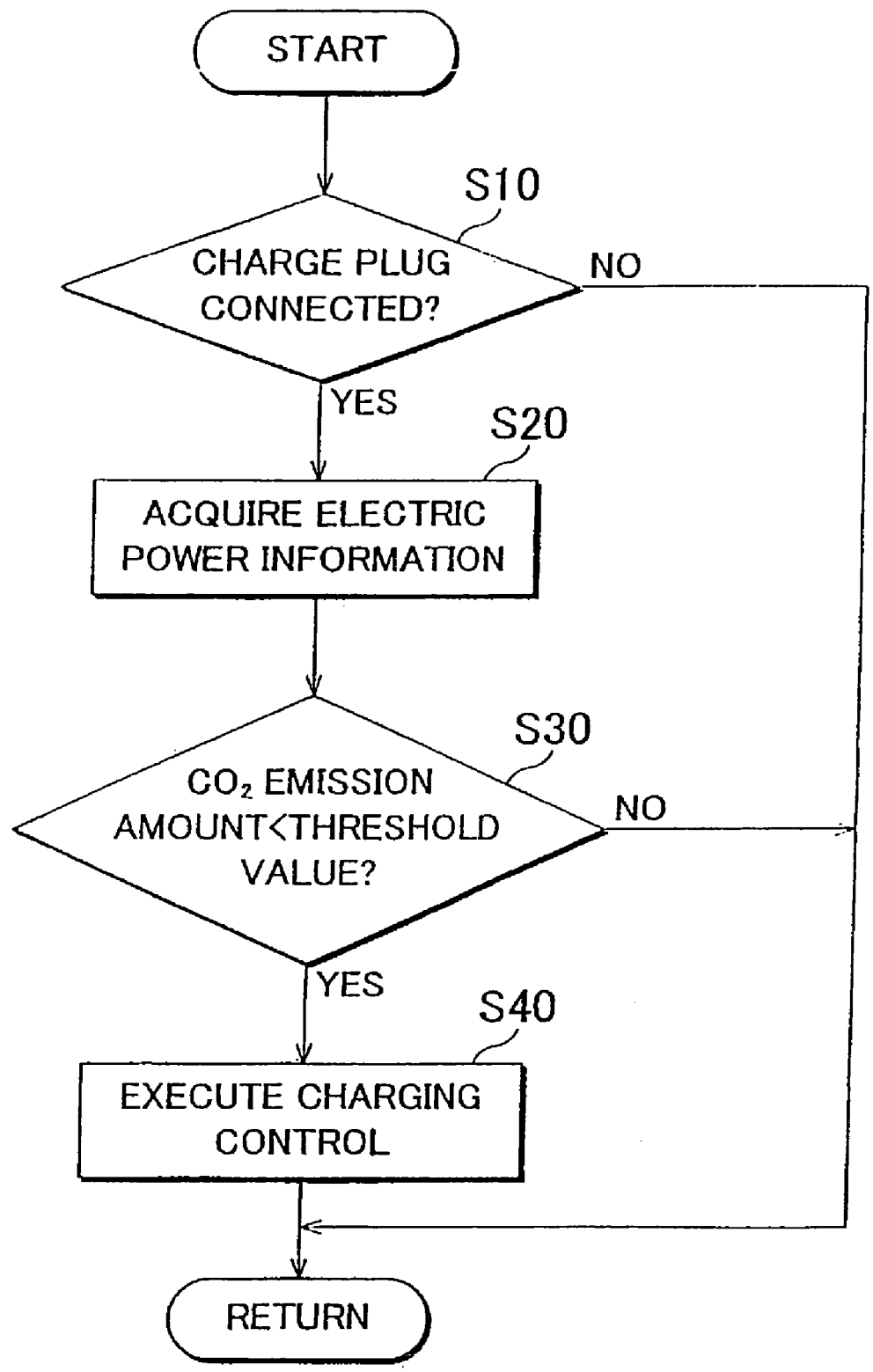
FIG. 3 is a flowchart of a process regarding judgment as to whether or not to execute a charging control by an HV-ECU shown in FIG. 2.

FIG. 3 is a flowchart of a process regarding judgment as to whether or not to execute the charging control by the HV-ECU 140 shown in FIG. 2. Incidentally, the process shown in this flowchart is called up from a main routine and is executed every certain time or every time a predetermined condition holds.

Referring to FIG. 3, the HV-ECU 140 determines whether or not the charge plug 170 is connected to the electric outlet 32 of the charging station 30 on the basis of the presence/absence of the voltage VC from the electric power sensor 134 (step S10). If it is determined that the charge plug 170 is not connected to the electric outlet 32 (NO in step S10), the HV-ECU 140 ends the process without performing the following series of process steps, and the process is returned to the main routine.

If it is determined that the charge plug 170 is connected to the electric outlet 32 (YES in step S10), the HV-ECU 140 acquires, via the communication cable 132, the electric power information received by the modem 130 from the electric power information server 50 (step S20).

Then, the HV-ECU 140 determines whether or not the $CO_2$ emission amount included in the acquired electric power information is below the threshold value (step S30). If it is determined that the $CO_2$ emission amount is below the threshold value (YES in step S30), the HV-ECU 140 outputs to the motive power output device 110 a command to charge the electricity storage device B (see FIG. 4) by inputting the commercial electric power supplied from the charging station 30, so that a charging control of the electricity storage device B is executed in the motive power output device 110 (step S40).

On the other hand, if it is determined that the $CO_2$ emission amount is higher than or equal to the threshold value (NO in step S30), the HV-ECU 140 ends the process without outputting the command to execute the charging control to the motive power output device 110, and the process is returned to the main routine.

Figure 4:
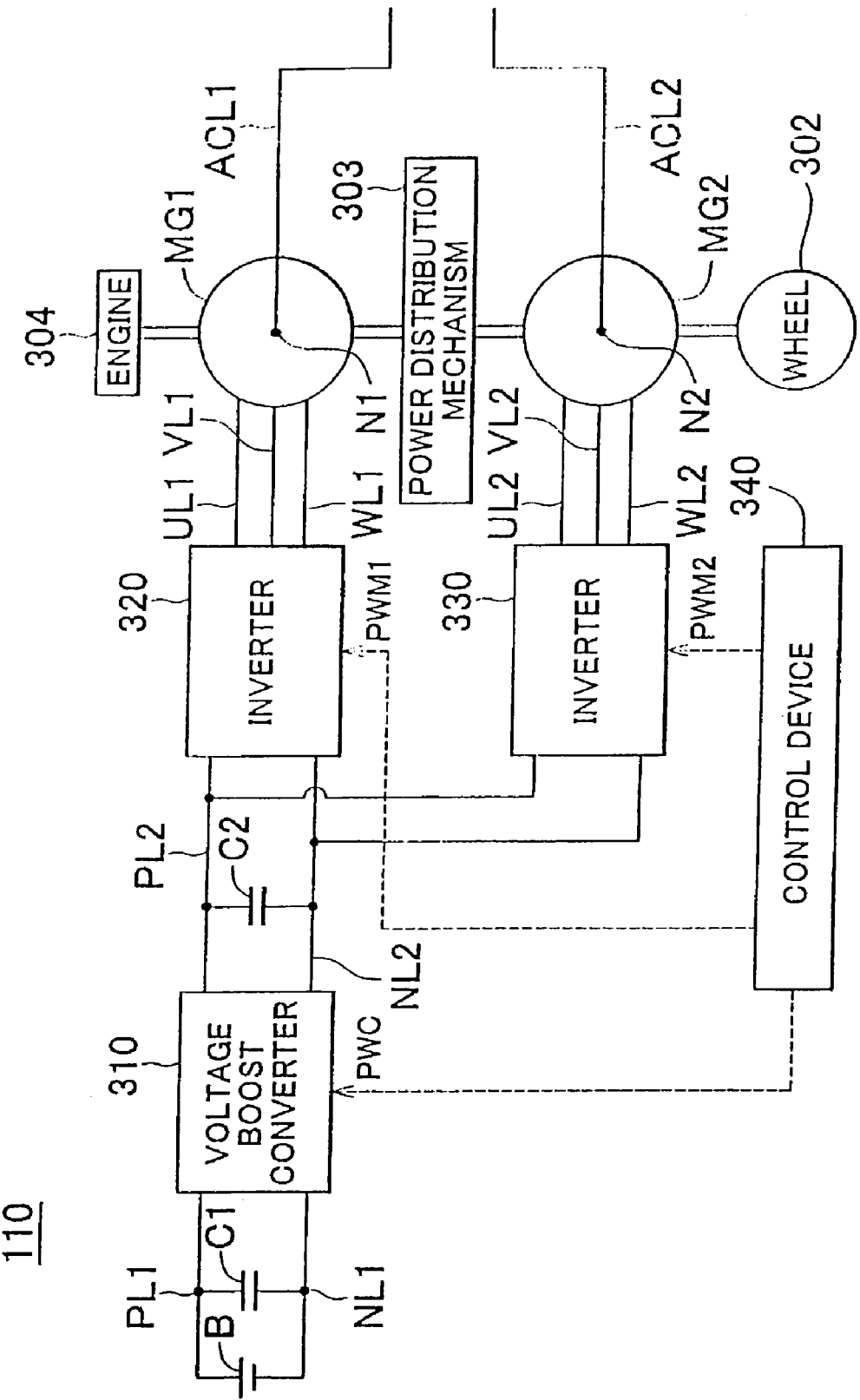
FIG. 4 is a functional block diagram of a motive power output device shown in FIG. 2.

FIG. 4 is a functional block diagram of the motive power output device 110 shown in FIG. 2. Referring to FIG. 4, the motive power output device 110 includes an engine 304, motor-generators MG1, MG2, a power distribution mechanism 303, and a wheel 302. The motive power output device 110 further includes the electricity storage device B, a voltage boost converter 310, inverters 320, 330, a control device 340, condensers C1, C2, positive electrode lines PL1, PL2, negative electrode lines SL1, SL2, U-phase lines UL1, UL2, V-phase lines VL1, VL2, and W-phase lines WL1, WL2.

The power distribution mechanism 303 is connected between the engine 304 and the motor-generators MG1, MG2, and distributes motive power therebetween. For example, as the power distribution mechanism 303, a planetary gear mechanism having three rotation shafts for a sun gear, a planetary carrier and a ring gear can be used. These three shafts are connected to the rotation shafts of the engine 304 and the motor-generators MG1, MG2, respectively. For example, by providing a hollow rotor of the motor-generator MG1 and inserting the crankshaft of the engine 304 through the center of the hollow rotor, the engine 304 and the motor-generators MG1, MG2 can be mechanically connected to the power distribution mechanism 303.

In addition, the rotation shaft of the motor-generator MG2 is linked to the wheel 302 by a speed-reducing gear and a running gear (which are not shown). Besides, a speed reducer for the rotation shaft of the motor-generator MG2 may further be incorporated within the power distribution mechanism 303.

In addition, the motor-generator MG1 is incorporated in the motive power output device 110 as a device that operates as an electric power generator that is driven by the engine 304, and also operates as an electric motor that is capable of starting up the engine 304. The motor-generator MG2 is incorporated in the motive power output device 110 as an electric motor that drives the wheel 302, which is a driving wheel.

The positive electrode of the electricity storage device B is connected to the positive electrode line PL1, and the negative electrode of the electricity storage device B is connected to the negative electrode line SL1. The condenser C1 is connected between the positive electrode line PL1 and the negative electrode line SL1. The voltage boost converter 310 is connected between the pair of the positive electrode line PL1 and the negative electrode line SL1 and the pair of the positive electrode line PL2 and the negative electrode line SL2. The condenser C2 is connected between the positive electrode line PL2 and the negative electrode line SL2. The inverter 320 is connected between the pair of the positive electrode line PL2 and the negative electrode line SL2 and the set of the U, V, W-phase lines UL1, VL1, WL1. The inverter 330 is connected between the pair of the positive electrode line PL2 and the negative electrode line SL2 and the set of the U, V, W-phase lines UL2, VL2, WL2. The motor-generator MG1 includes a Y-connected three-phase coil (not shown) as a stator coil, and is connected to the U, V, W-phase lines UL1, VL1, WL1. Likewise, the motor-generator MG2 includes a Y-connected three-phase coil (not shown) as a stator coil, and is connected to the U, V, W-phase lines UL2, VL2, WL2. The electric power input line ACL1 is connected to a neutral point N1 of the three-phase coil of the motor-generator MG1, and the electric power input line ACL2 is connected to a neutral point N2 of the three-phase coil of the motor-generator MG2.

The electricity storage device B is a chargeable-dischargeable direct-current power source, and is made up of, for example, a secondary battery cell of a nickel metal hydride type, a lithium ion type, etc. The electricity storage device B outputs direct-current electric power to the voltage boost converter 310. Besides, the electricity storage device B is charged with electric power that is output from the voltage boost converter 310. Incidentally, a large-capacity capacitor may be used as the electricity storage device B. The condenser C1 smoothes fluctuations in the voltage between the positive electrode line PL1 and the negative electrode line SL1.

The voltage boost converter 310, on the basis of a signal PWC from the control device 340, boosts the direct-current voltage received from the electricity storage device B, and outputs the boosted voltage to the positive electrode line PL2. Besides, the voltage boost converter 310, on the basis of the signal PWC from the control device 340, lowers the direct-current voltage received from the inverters 320, 330 via the positive electrode line PL2 to a voltage level of the electricity storage device B, and charges the electricity storage device B therewith. The voltage boost converter 310 is constructed of, for example, a boosting/lowering type chopping circuit or the like.

The condenser C2 smoothes fluctuations in the voltage between the positive electrode line PL2 and the negative electrode line SL2. The inverter 320, on the basis of a signal PWM1 from the control device 340, converts the direct-current voltage received from the positive electrode line PL2 into a three-phase alternating-current voltage, and outputs the converted three-phase alternating-current voltage to the motor-generator MG1. Therefore, the motor-generator MG1 is driven so as to generate the designated torque. Besides, the inverter 320, on the basis of the signal PWM1 from the control device 340, converts the three-phase alternating-current voltage that the motor-generator MG1 generates when receiving the output of the engine 304, into a direct-current voltage, and outputs the converted direct-current voltage to the positive electrode line PL2.

The inverter 330, on the basis of a signal PWM2 from the control device 340, converts the direct-current voltage received from the positive electrode line PL2 into a three-phase alternating-current voltage, and outputs the converted three-phase alternating-current voltage to the motor-generator MG2. Therefore, the motor-generator MG2 is driven so as to generate the designated torque. Besides, during the regenerative braking of the motor vehicle, the inverter 330, on the basis of the signal PWM2 from the control device 340, converts the three-phase alternating-current voltage that the motor-generator MG2 generates when receiving the turning force from the wheel 302, into a direct-current voltage, and outputs the converted direct-current voltage to the positive electrode line PL2.

Incidentally, the regenerative braking herein includes a braking involving regenerative power generation which is performed when there occurs a foot brake operation performed by a driver, and a deceleration (or discontinuation of acceleration) of the motor vehicle accompanied by regenerative power generation which is caused by turning off the accelerator pedal but not operating the foot brake during vehicle running.

Besides, when the electricity storage device B is charged by inputting commercial electric power from the electric power input lines ACL1, ACL2, the inverters 320, 330, on the basis of the signals PWM1, PWM2 from the control device 340, converts the commercial electric power given to the neutral points N1, N2 of the motor-generators MG1, MG2 into direct-current electric power, and outputs the converted direct-current electric power to the positive electrode line PL2.

Each of the motor-generators MG1, MG2 is a three-phase alternating-current electric motor, and, for example, is made of a three-phase alternating-current synchronous electric motor. The motor-generator MG1 generates a three-phase alternating-current voltage through the use of output of the engine 304, and outputs the generated three-phase alternating-current voltage to the inverter 320. Besides, the motor-generator MG1 generates driving power by the three-phase alternating-current voltage received from the inverter 320, to start up the engine 304. The motor-generator MG2 generates driving torque for the motor vehicle by the three-phase alternating-current voltage received from the inverter 330. Besides, during the regenerative braking of the motor vehicle, the motor-generator MG2 generates three-phase alternating-current voltage, and outputs it to the inverter 330.

The control device 340 generates the signal PWC for driving the voltage boost converter 310 and the signals PWM1, PWM2 for driving the inverters 320, 330, respectively, and outputs the generated signals PWC, PWM1, PWM2 to the voltage boost converter 310 and the inverters 320, 330, respectively.

When the control device 340 receives from the HV-ECU 140 (not shown in FIG. 4) a command to charge the electricity storage device B by inputting the commercial electric power from the electric power input lines ACL1, ACL2, the control device 340 generates signals PWM1 PWM2 for controlling the inverters 320, 330 so that the inverters 320, 330 convert the commercial electric power given to the neutral points N1, N2 from the electric power input lines ACL1, ACL2, into direct-current electric power, and output the direct-current electric power to the positive electrode line PL2.

Figure 5:
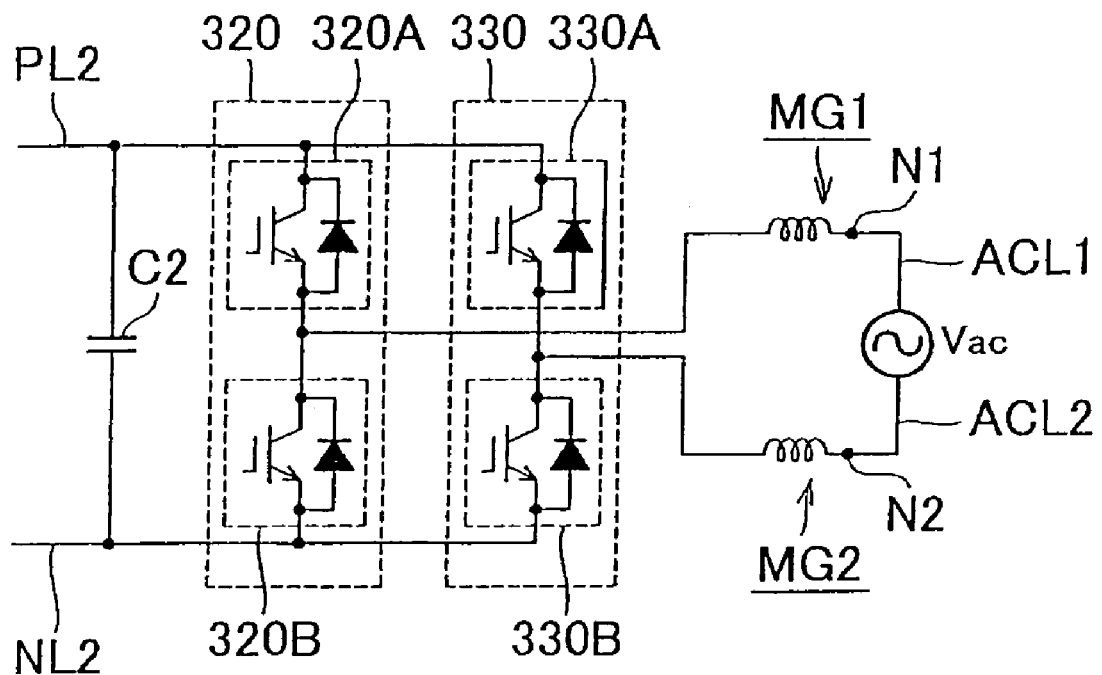
FIG. 5 is a diagram showing a zero-phase equivalent circuit of inverters and a motor-generator shown in FIG. 4.

FIG. 5 shows a zero-phase equivalent circuit of the inverters 320, 330 and the motor-generators MG1, MG2 shown in FIG. 4. In the individual inverters 320, 330 that are three-phase inverters, there are eight patterns of combinations of the on/off states of six transistors. In two of the eight switching patterns, the interface voltage is zero, and such a voltage state is termed zero-voltage vector. In the zero-voltage vector, the three transistors in an upper arm can be considered to be in the same switching state (all in the on or off state), and the three transistors in a lower arm can also be considered to be in the same switching state. Therefore, in FIG. 5, the three transistors in the upper arm of the inverter 320 are collectively shown as an upper arm 320A, and the three transistors in the lower arm of the inverter 320 are collectively shown as a lower arm 320B. Likewise, the three transistors in the upper arm of the inverter 330 are collectively shown as an upper arm 330A, and the three transistors in the lower arm of the inverter 330 are collectively shown as a lower arm 330B.

As shown in FIG. 5, the zero-phase equivalent circuit can be seen as a single-phase PWM converter that receives as an input the alternating-current commercial electric power given to the neutral points N1, N2 via the electric power input lines ACL1, ACL2. Hence, through the switching control of changing the zero-voltage vector in each of the inverters 320, 330 so that the inverter 320, 330 operates as a corresponding one of the signal-phase arm of the single-phase PWM converter, the alternating-current commercial electric power can be converted into direct-current electric power, and the direct-current electric power can be output to the positive electrode line PL2.

Figure 6:
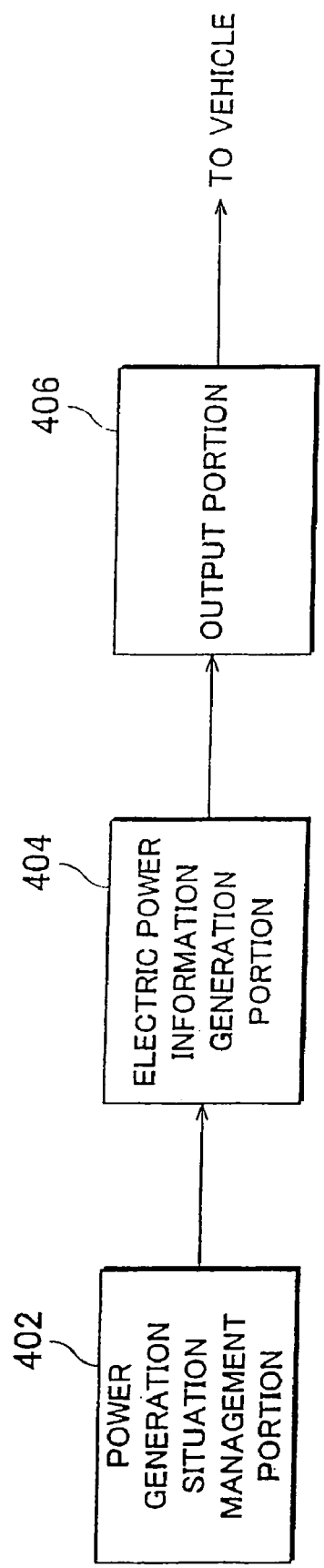
FIG. 6 is a functional block diagram of an electric power information server shown in FIG. 1.
Figure 7:
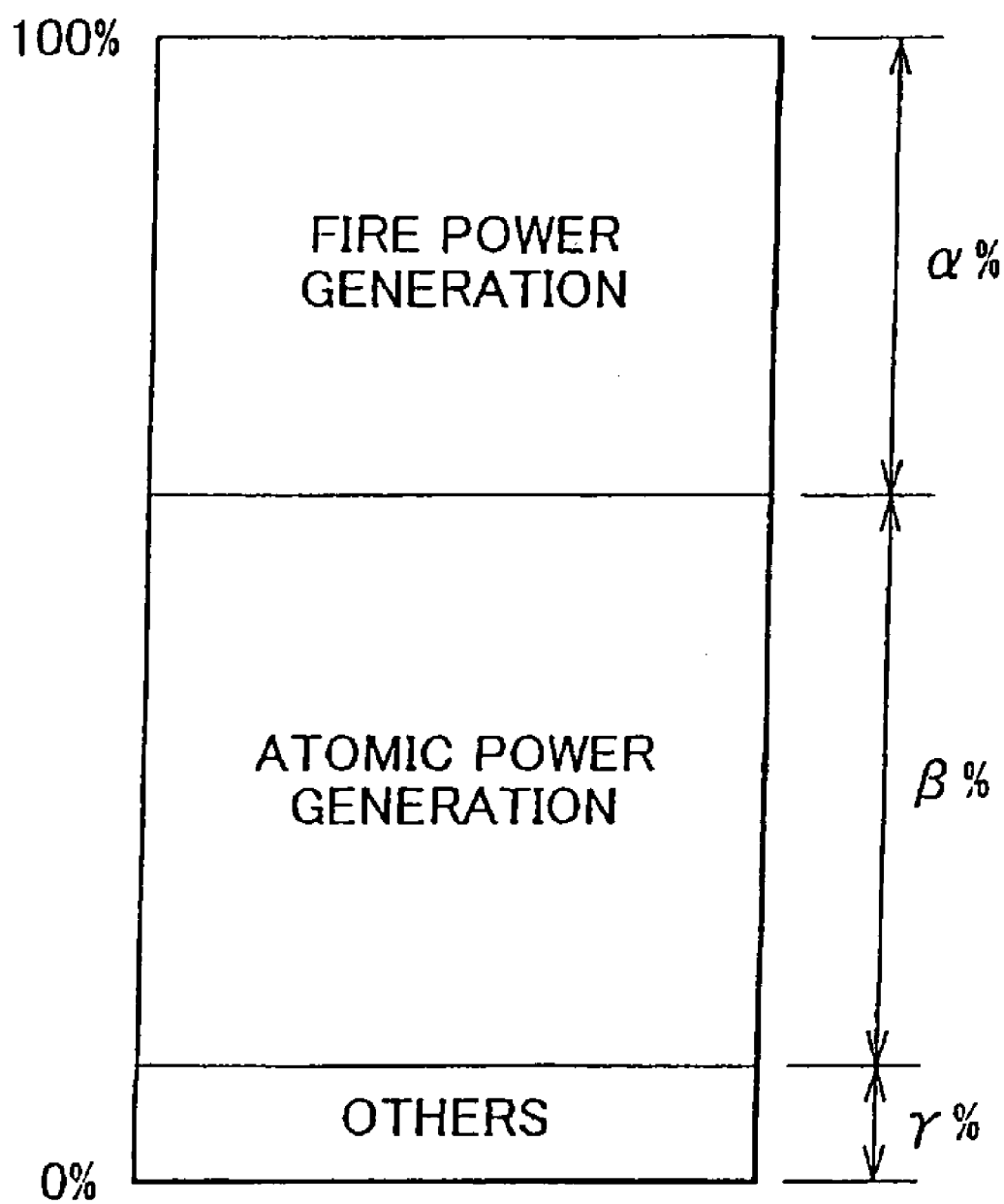
FIG. 7 is a diagram showing proportions accounted for by electric power generation methods in the commercial electric power.

FIG. 6 is a functional block diagram of the electric power information server 50 shown in FIG. 1. Referring to FIG. 6, the electric power information server 50 includes a power generation situation management portion 402, an electric power information generation portion 404, and an output portion 406. The power generation situation management portion 402 calculates proportions accounted for by the electric power generation methods in the commercial electric power output to the electricity transmission line 20, on the basis of the amounts of power generation of the power plants connected to the electricity transmission line 20. Concretely, as shown in FIG. 7, the proportions accounted for by the fire power generation, the atomic power generation, and the other power generation methods in the commercial electric power output to the electricity transmission line 20 are calculated.

Incidentally, the proportions of the power generation methods fluctuate depending on the season, the time of day, etc. Particularly, in the fire power generation, the operation adjustment is easier than in the atomic power generation or the like, so that the amount of power generation by the fire power generation is adjusted in accordance with fluctuations in the demand for electric power. Accordingly, the proportions of the electric power generation methods fluctuate. Generally, in the seasons or times of day with higher demands for electric power, the proportion of the fire power generation becomes correspondingly higher, so that the $CO_2$ emission amount in the generating process of commercial electric power increases.

The electric power information generation portion 404 calculates the $CO_2$ emission amount involved in the generation of commercial electric power on the basis of data regarding the emission amounts of carbon dioxide in the electric power generation methods. For example, the electric power information generation portion 404 calculates the $CO_2$ emission amount involved in the generation of the commercial electric power supplied to the electricity transmission line 20 by multiplying the proportions of the individual electric power generation methods received from the power generation situation management portion 402, by corresponding emission amounts of carbon dioxide per unit power in the electric power generation methods, and taking a total sum of the emission amounts of carbon dioxide of the electric power generation methods. Then, the electric power information generation portion 404 outputs electric power information that includes the calculated $CO_2$ emission amount to the output portion 406.

The output portion 406 includes a model capable of transmitting data via the electricity transmission line 20. Upon receiving electric power information from the electric power information generation portion 404, the output portion 406 outputs the received electric power information to the electricity transmission line 20 through the use of the modem.

As in the above, according to a first embodiment, the charging of the electricity storage device B is performed by inputting commercial electric power only when the $CO_2$ emission amount involved in the generation of commercial electric power is below the pre-set threshold value. Therefore, it is possible to use, for the charging, only "clean" electric power with small emission amount of carbon dioxide in the generating process of commercial electric power. In consequence, it is possible to contribute to reduction of the emission amount of carbon dioxide.

Besides, electric power information that includes the $CO_2$ emission amount involved in the generation of commercial electric power is output from the electric power information server 50 to the electricity transmission line 20, and is received by the modem 130 that is provided in the electric vehicle 40. Hence, there is no need to separately provide a communication medium for exchanging electric power information between the electric power information server 50 and the electric vehicle 40. Furthermore, since the $CO_2$ emission amount included in the electric power information is displayed in the display portion 142, the emission amount of carbon dioxide can be presented to the user of the electric vehicle 40, and therefore the user can be made conscious of environmental protection.

In a second embodiment, the $CO_2$ emission amount received from the electric power information server 50 at each time of charging from the charging station 30 is added up to calculate the total emission amount of carbon dioxide. Therefore, from the viewpoint of the total emission amount of carbon dioxide, the degree of contribution of the electric vehicle to the environment can be evaluated. Furthermore, by presenting the total emission amount of carbon dioxide to users, the users can be made conscious of environmental protection.

Figure 8:
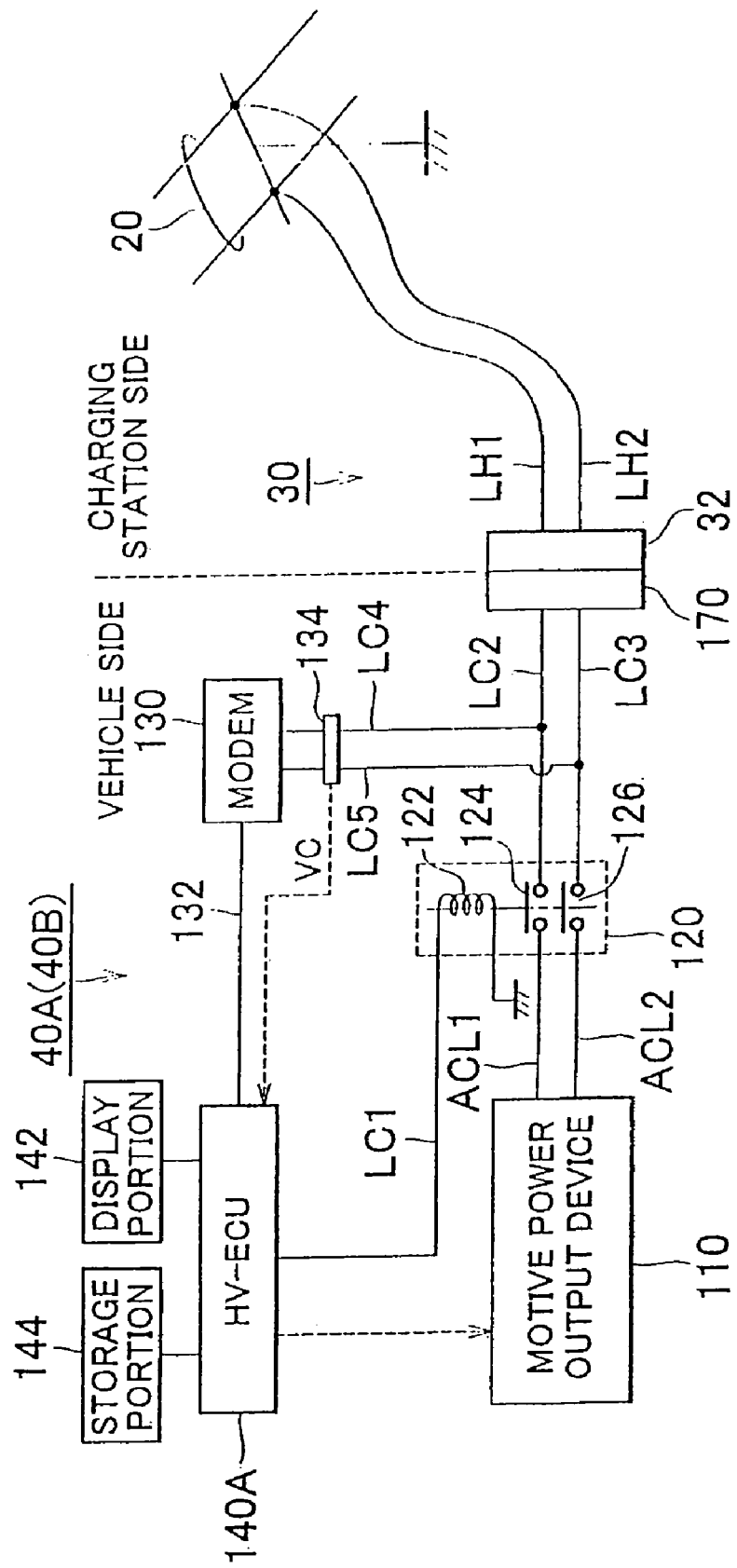
FIG. 8 is an overall block diagram of an electric vehicle according to a second embodiment of this invention.

FIG. 8 is an overall block diagram of an electric vehicle according to the second embodiment of the invention. Referring to FIG. 8, an electric vehicle 40A has a construction similar to the construction of the electric vehicle 40 according to the first embodiment, but further includes a storage portion 144, and includes an HV-ECU 140A instead of the HV-ECU 140.

The storage portion 144 is a re-writable non-volatile memory. The storage portion 144 stores the $CO_2$ emission amount received from the HV-ECU 140A, and outputs the stored $CO_2$ emission amount to the HV-ECU 140A on the basis of a command from the HV-ECU 140A.

The HV-ECU 140A, upon acquiring electric power information from the modem 130, outputs the $CO_2$ emission amount included in the electric power information to the storage portion 144. Then, when the electric vehicle 40A is activated, the HV-ECU 140A reads out the individual $CO_2$ emission amounts acquired and stored in the storage portion 144 at the times of charging up to the present time, from the storage portion 144, and outputs the integrated amount of the $CO_2$ emission amounts as a total $CO_2$ emission amount to the display portion 142.

Incidentally, the HV-ECU 140A may calculate the total $CO_2$ emission amount and may output it to the storage portion 144 at the time of charging from the charging station 30. After the electric vehicle 40A is activated, the HV-ECU 140A may read out the total $CO_2$ emission amount from the storage portion 144, and may output it to the display portion 142.

Incidentally, since the electric vehicle 40A is a hybrid vehicle equipped also with the engine 304 as a motive power source, the $CO_2$ emission amount from the engine 304 may be added in the total $CO_2$ emission amount displayed in the display portion 142. The $CO_2$ emission amount from the engine 304 can be calculated, for example, on the basis of the amount of fuel consumed by the engine 304, if a relation between the amount of fuel consumed by the engine 304 and the $CO_2$ emission amount is determined beforehand in the form of a map.

Figure 9:
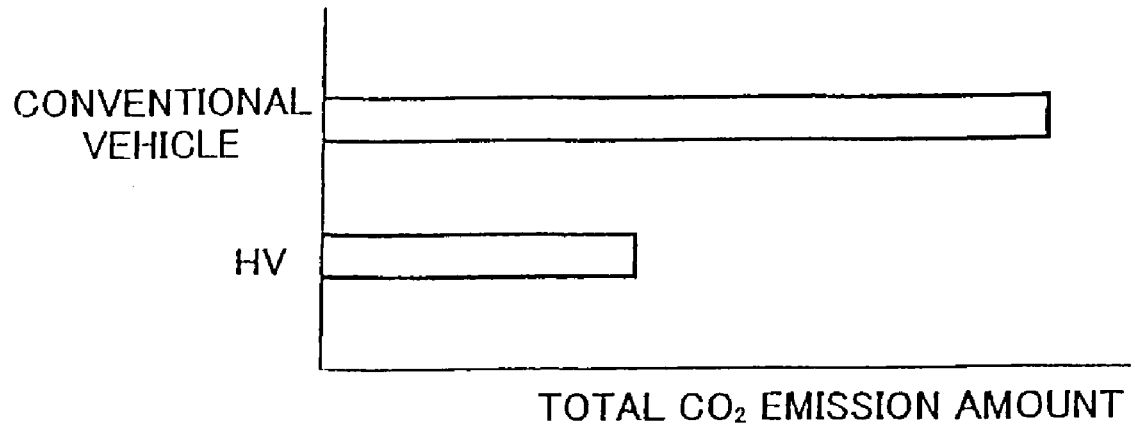
FIG. 9 is a diagram showing an example of the state of display of a total $CO_2$ emission amount displayed in a display portion.

FIG. 9 is a diagram showing an example of the state of display of the total $CO_2$ emission amount displayed in the display portion 142. Referring to FIG. 9, the total $CO_2$ emission amount from the electric vehicle 40 is visually shown by a bar chart or the like at a position "HV". Besides, a pre-calculated total $CO_2$ emission amount produced by a conventional vehicle (the total $CO_2$ emission amount produced by an engine in the case where the engine is the only motive power source of the motor vehicle) is displayed for comparison.

As in the above, according to the second embodiment, the information regarding the $CO_2$ emission amount which is received at each time of charging from the charging station 30 is stored, and a total $CO_2$ emission amount is calculated and displayed in the display portion 142. Therefore, from the viewpoint of the total emission amount of carbon dioxide, the degree of contribution of the electric vehicle 40 to the environment can be evaluated. Besides, since the total emission amount of carbon dioxide is presented to the user, an increase in the use of clean electric power with small emission amount of carbon dioxide can be expected.

In a third embodiment, information regarding the cost of commercial electric power is further included in the electric power information, and the cost of commercial electric power is taken into consideration in judgment as to whether or not to execute the charging from the charging station 30.

The overall construction of an electric vehicle according to the third embodiment is the same as that of the electric vehicle 40 according to the first embodiment shown in FIG. 2.

Figure 10:
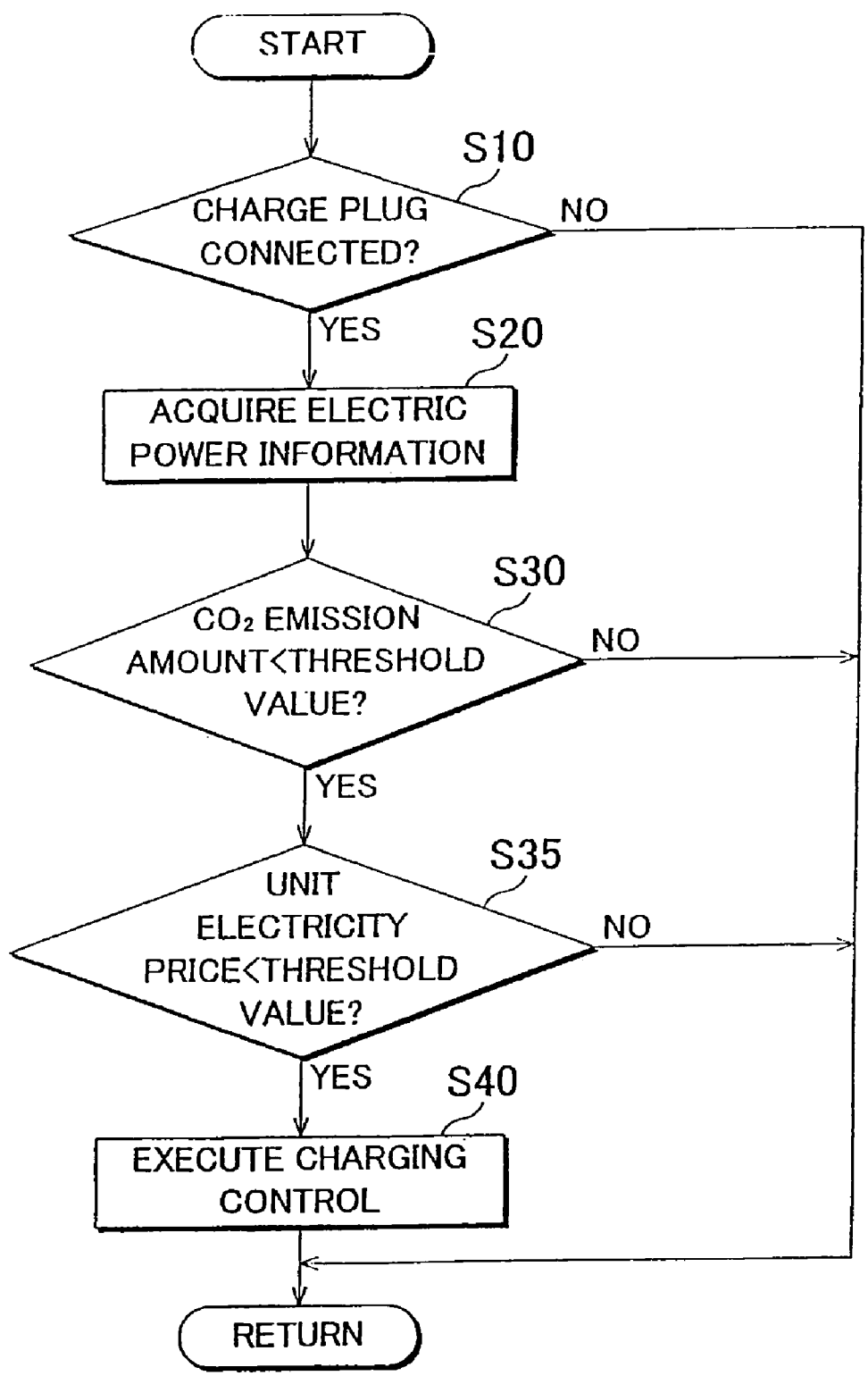
FIG. 10 is a flowchart of a process regarding judgment as to whether or not to execute a charging control by an HV-ECU in a third embodiment of this invention.

FIG. 10 is a flowchart of a process regarding judgment as to whether or not to execute the charging control by the HV-ECU 140 according to the third embodiment. Incidentally, the process shown in this flowchart is called up from a main routine and is executed every certain time or every time a predetermined condition holds.

Referring to FIG. 10, the process shown in this flowchart further includes step S35 in addition to the process shown in FIG. 3. Specifically, if in step S30 it is determined that the $CO_2$ emission amount is below a threshold value (YES in step S30), the HV-ECU 140 determines whether or not the unit electricity price of commercial electric power included in the electric power information acquired in step S20 is below a pre-set threshold value (step S35).

If the HV-ECU 140 determines that the unit electricity price of commercial electric power is below the threshold value (YES in step S35), the HV-ECU 140 proceeds to step S40, in which the charging control is executed in the motive power output device 110.

On the other hand, if in step S35 it is determined that the unit electricity price of commercial electric power is higher than or equal to the threshold value (NO in step S35), the HV-ECU 140 ends the process without outputting a command to execute the charging control to the motive power output device 110, so that the process is returned to the main routine.

As in the above, according to the third embodiment, not only the emission amount of carbon dioxide but also the cost of commercial electric power at the time of charging (generally, the late-night electric power is less expensive than the daytime electric power) is taken into consideration. Therefore, besides contribution to environmental protection, reduction of the energy cost of the electric vehicle 40 can be achieved.

In a fourth embodiment, the $CO_2$ emission amount associated with the running of the motor vehicle is calculated, and the calculated $CO_2$ emission amount is output to an external device or the like outside the motor vehicle via a charging cable, at the time of charging from a charging station 30. Due to this, the data of the $CO_2$ emission amount associated with the running of the motor vehicle becomes available at a server outside the motor vehicle, or a terminal device 70 (a personal computer or the like) at one's home, and therefore the management of the $CO_2$ emission amount and the comparison with other people (vehicles) become possible.

The overall construction of an electric power system that includes an electric vehicle 40B according to the fourth embodiment is the same as that of the electric power system 1 shown in FIG. 1, and the overall construction of the electric vehicle 40B is the same as that of the electric vehicle 40A shown in FIG. 8.

Figure 11:
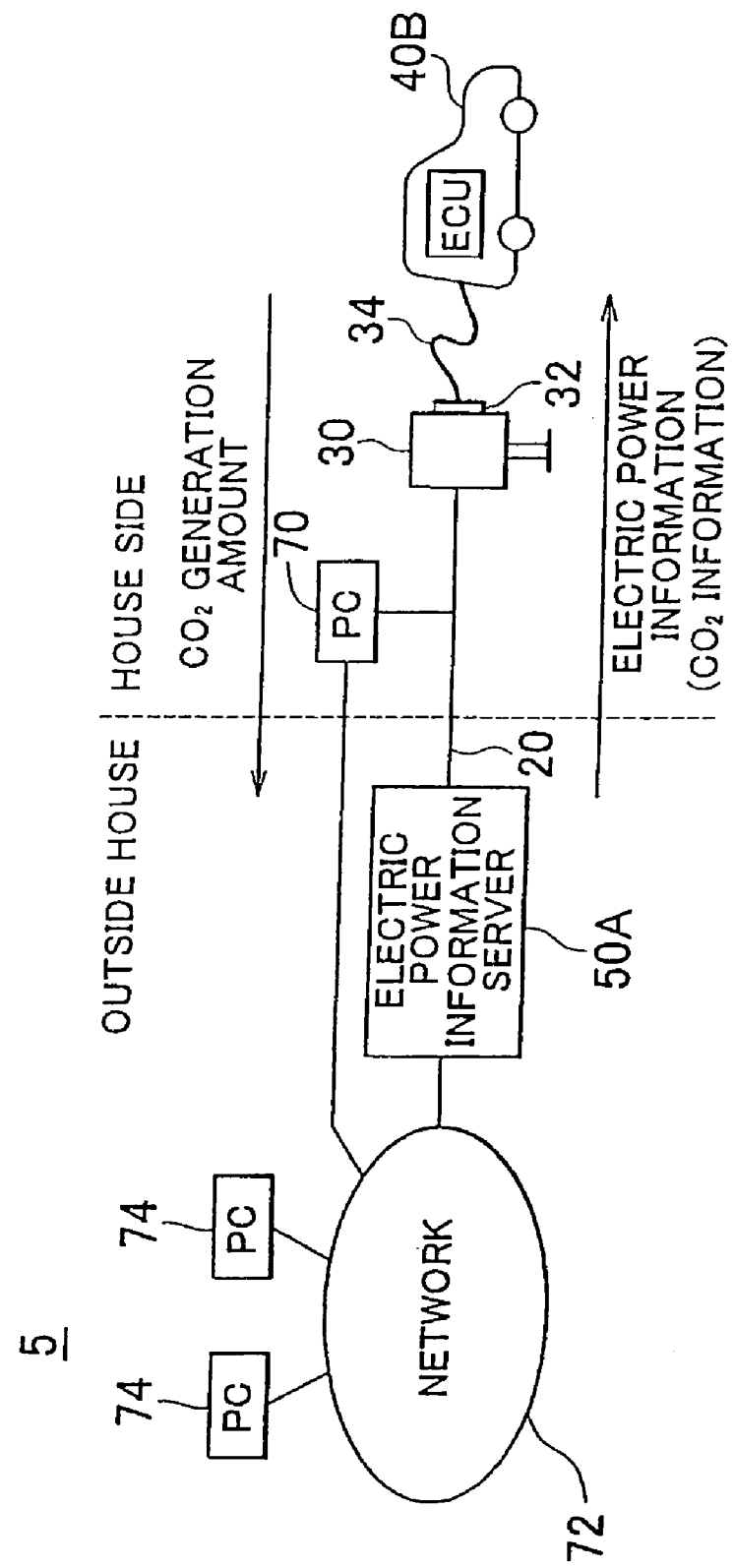
FIG. 11 is a schematic diagram of an information system that includes an electric vehicle according to a fourth embodiment.

FIG. 11 is a schematic diagram of an information system that includes the electric vehicle 40B according to the fourth embodiment. Referring to FIG. 11, an information system 5 includes an electric vehicle 40B, a charging cable 34, a charging station 30, an electric power information server 50A, a network 72, and terminal devices 70, 74.

The electric vehicle 40B acquires electric power information output from the electric power information server 50A to an electricity transmission line 20, via the charging station 30 and the charging cable 34. Besides, the electric vehicle 40B calculates the $CO_2$ emission amount associated with the running of the motor vehicle by a method described below, and outputs the calculated $CO_2$ emission amount to an external device or the like outside the motor vehicle via the charging cable 34. Furthermore, the electric vehicle 40B displays the calculated $CO_2$ emission amount to a user. Incidentally, the charging cable 34 corresponds to the electric power lines LC2, LC3 shown in FIG. 8. In addition, other functions of the electric vehicle 40B are the same as those of the electric vehicle 40B according to the first embodiment.

The electric power information server 50A generates electric power information, and outputs it to the electricity transmission line 20. Besides, the electric power information server 50A receives, via charging station 30 and the electricity transmission line 20, the $CO_2$ emission amount output from the electric vehicle 40B via the charging cable 34. Then, the electric power information server 50A indicates data regarding the $CO_2$ emission amount received from the electric vehicle 40B and other electric vehicles, in accordance with a request from the terminal devices 70, 74 that are connected to the network 72.

The terminal device 70 is a personal terminal owned by a user of the electric vehicle 40B, and is connected to an electric power line in a dwelling house or the like. The terminal device 70 receives, via the electric power line in the house, the $CO_2$ emission amount output from the electric vehicle 40B via the charging cable 34. Due to this, the user of the electric vehicle 40B can manage the $CO_2$ emission amount associated with the running of the electric vehicle 40B, through the use of the terminal device 70 at user's home.

The terminal device 70 is connected also to the network 72, and can access to the electric power information 50A and acquire data regarding the $CO_2$ emission amount of the electric vehicle 40B and other electric vehicles. Due to this, the user of the electric vehicle 40B can compare the $CO_2$ emission amount associated with the running of the electric vehicle 40B with the $CO_2$ emission amounts of other people's electric vehicles.

As described above, the electric vehicle 40B calculates the $CO_2$ emission amount associated with the running of the motor vehicle, and outputs the calculated $CO_2$ emission amount to an external device or the like outside the motor vehicle via the charging cable 34. Herein, the $CO_2$ emission amount associated with the running of the motor vehicle includes the $CO_2$ emission amount the engine 304 emits (hereinafter, referred to also as "engine $CO_2$ amount"), and the $CO_2$ amount having been emitted in generating the electric power consumed by the motor-generator MG2. There are various generation sources for the electric power stored in the electricity storage device B that supplies electric power to the motor-generator MG2. The electric power generation sources are different from one another in the $CO_2$ amount they emit in the generation of electric power.

Figure 12:
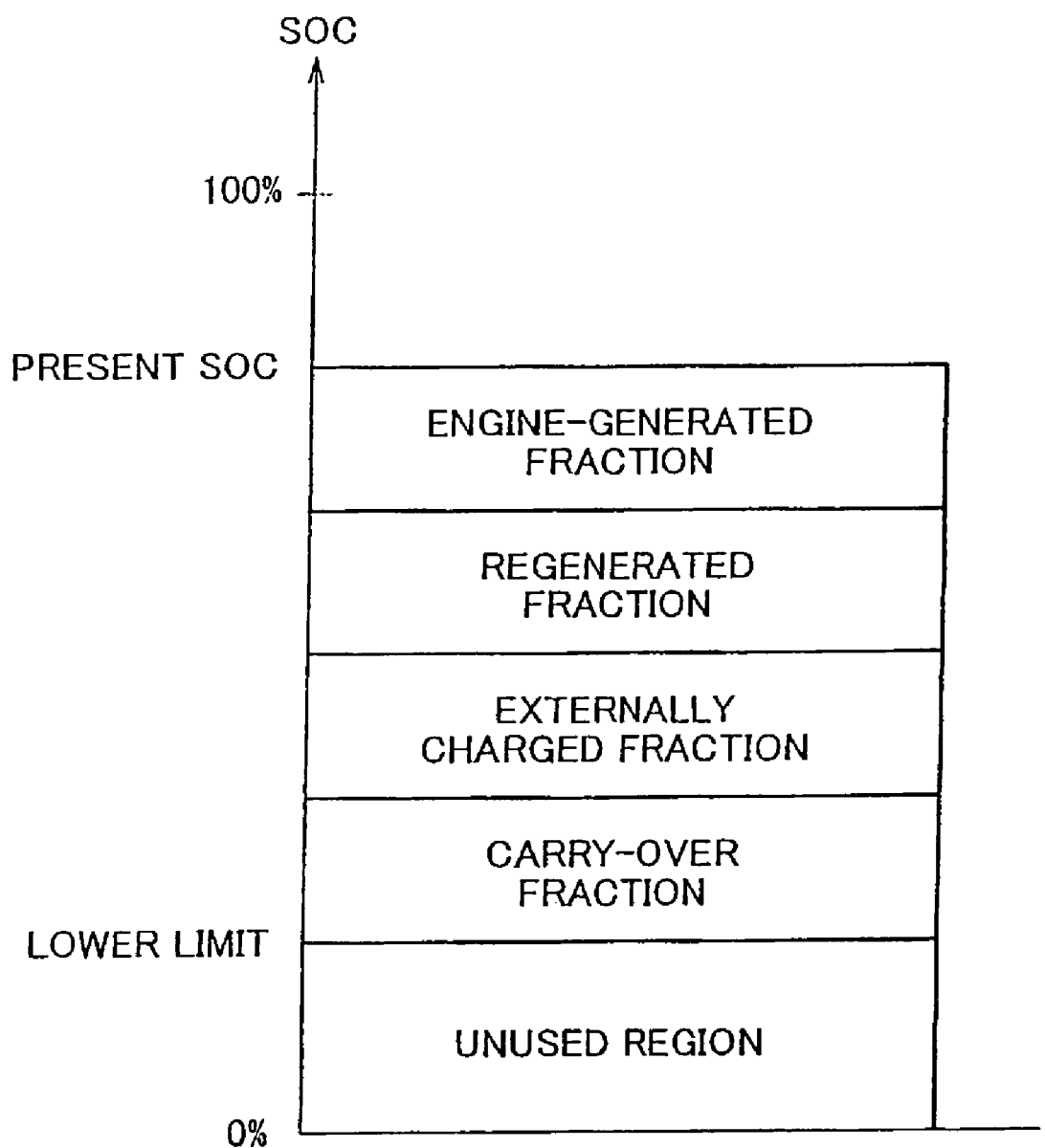
FIG. 12 is a diagram showing the electric power stored in the electricity storage device separately for each source.

FIG. 12 is a diagram showing the electric power stored in the electricity storage device B separately for each generation source. Referring to FIG. 12, the electric power in the electricity storage device B is made up of an unused region fraction, a carry-over fraction from the previous run, a regenerated fraction, and an engine-generated fraction. The unused region fraction is an electric power corresponding to the use lower limit value of the electricity storage device B, and the $CO_2$ amount having been emitted in generating the unused region fraction of electric power is a fixed amount that remains unchanged from the time of shipment of the motor vehicle. The carry-over fraction from the previous run is an electric power obtained by subtracting the unused fraction from the stored electricity amount occurring at the end of the previous run (prior to the charging from the charging station 30). The $CO_2$ amount having been emitted in generating the carry-over fraction of electric power (hereinafter, referred to also as "carry-over $CO_2$ amount") can be calculated by multiplying the carry-over fraction of electric energy by the $CO_2$ basic unit occurring at the end of the previous run (the $CO_2$ amount having been emitted in generating the unit amount of electric power stored in the electricity storage device B).

The externally charged fraction is an electric power charged from the charging station 30 through the use of the charging cable 34. The $CO_2$ amount having been emitted in generating the externally charged fraction of electric power (hereinafter, referred to also as "external charge $CO_2$ amount") can be calculated by multiplying the amount of charge from the charging station 30 by the $CO_2$ emission amount included in the electric power information received from the electric power information server 50A (the $CO_2$ amount having been emitted in generating a unit amount of commercial electric power). The regenerated fraction is an electric power generated by the motor-generator MG2 at the time of regenerative braking. The $CO_2$ amount having been emitted in generating the regenerated fraction of electric power is zero.

The engine-generated fraction is an electric power that the motor-generator MG1 has generated through the use of the motive power of the engine 304. The $CO_2$ amount having been emitted in generating the engine-generated fraction of electric power is calculated on the basis of the engine $CO_2$ amount. Incidentally, in the electric vehicle 40B, since the motive power of the engine 304 is distributed between the axle shaft and the motor-generator MG1 by the power distribution mechanism 303, the engine $CO_2$ amount is also distributed between the motor vehicle drive fraction and the fraction of power generation by the motor-generator MG1 in accordance with the power distribution by the power distribution mechanism 303. Specifically, the $CO_2$ amount having been emitted in generating the engine-generated fraction of electric power is an amount distributed from the engine $CO_2$ amount in accordance with the power distribution by the power distribution mechanism 303. Incidentally, the engine $CO_2$ amount can be calculated, for example, on the basis of the amount of fuel consumed by the engine 304 as described above.

Then, the $CO_2$ amount having been emitted in generating to the unit amount of power stored in the electricity storage device B, that is, the $CO_2$ basic unit, can be calculated by dividing the integrated value of the $CO_2$ emission amounts of the individual electric power fractions by the electric power integrated value. Then, by multiplying the electric power consumption amount of the motor-generator MG2 by the $CO_2$ basic unit, the $CO_2$ amount having been emitted in obtaining the motor vehicle driving power by the motor-generator MG2 can be calculated.

Figure 13:
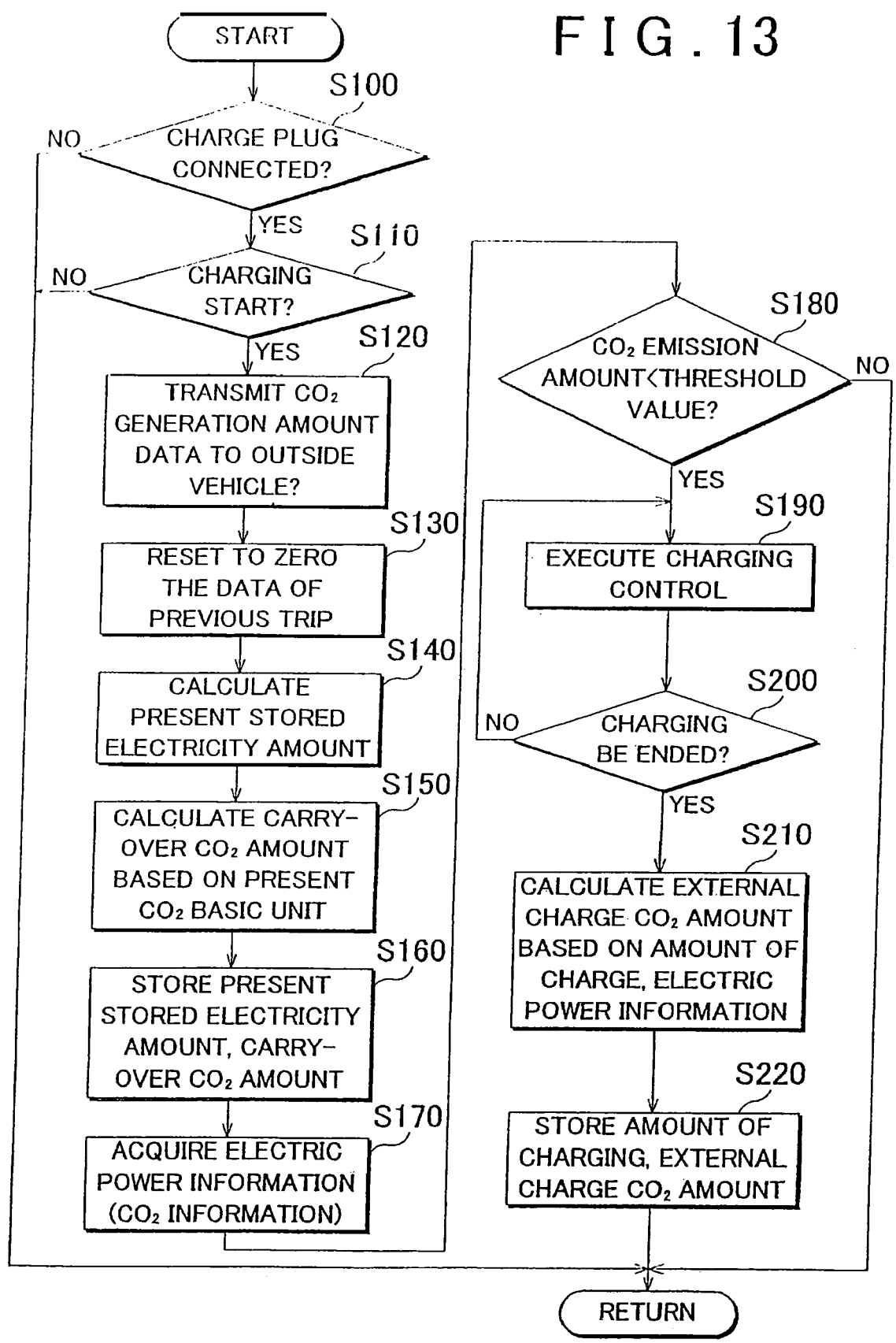
FIG. 13 is a flowchart of a charging process performed by an HV-ECU that is included in the electric vehicle shown in FIG. 11.

FIG. 13 is a flowchart of a charging process performed by an HV-ECU that is included in the electric vehicle 40B shown in FIG. 11. Incidentally, the process shown in this flowchart is called up from the main routine and executed at every certain time or when a predetermined condition holds.

Referring to FIG. 13 and FIG. 8 showing the construction of the electric vehicle 40B, the HV-ECU 140B of the electric vehicle 40B determines whether or not the charge plug 170 is connected to the electric outlet 32 of the charging station 30 on the basis of the presence/absence the voltage VC from the electric power sensor 134 (step S100). If the HV-ECU 140B determines that the charge plug 170 is not connected to the electric outlet 32 (NO in step S100), the HV-ECU 140B ends the process without executing the subsequent series of process steps, and the process returns to the main routine.

If the HV-ECU 140B determines that the charge plug 170 is the electric outlet 32 (YES at step S100), the HV-ECU 140B determines whether or not the start of the charging from the charging station 30 has been commanded (step S110). Incidentally, the start of the charging is commanded by the user, for example, via a charge button or the like. If the start of the charging has not been commanded (NO in step S110), the HV-ECU 140B ends the process without performing the subsequent series of process steps, and the process returns to the main routine.

If the start of the charging from the charging station 30 is commanded (YES in step S110), the HV-ECU 140B, prior to actual start of the charging, reads data regarding the $CO_2$ emission amount up to the previous run of the motor vehicle from the storage portion 144, and outputs to an external device or the like outside the motor vehicle through the use of the modem 130, via the electric power lines LC2, LC3 that make up the charging cable (step S120). As the data regarding the $CO_2$ emission amount, the HV-ECU 140B transmits to the external device or the like outside the motor vehicle the data of the total emission amount of $CO_2$ per travel distance during the previous trip and the $CO_2$ emission amount per travel distance during the previous trip as well as the cumulative $CO_2$ emission amount from the time point of start of the use of the motor vehicle and the $CO_2$ emission amount per travel distance from the time point of the use of the motor vehicle. Details of these data will be described below in conjunction with the calculation process. Then, after the data is transmitted to the external device or the like outside the motor vehicle, the HV-ECU 140B resets to zero the total emission amount of $CO_2$ during the previous trip and the corresponding $CO_2$ emission amount per travel distance (step S130).

Subsequently, the HV-ECU 140B calculates the present stored electricity amount of the electricity storage device B (step S140). Then, the HV-ECU 140B calculates a carry-over $CO_2$ amount by multiplying the value obtained by subtracting the electric power of the unused region (the electric power corresponding to the use lower limit of the electric power of the electricity storage device B) from the calculated stored electricity amount, by the $CO_2$ basic unit (step S150). After that, the HV-ECU 140B stores the present stored electricity amount and the carry-over $CO_2$ amount into the storage portion 144 (step S160).

Then, the HV-ECU 140B acquires, via the communication cable 132, the electric power information received by the modem 130 from the electric power information server 50A (step S170). Then, the HV-ECU 140B determines whether or not the $CO_2$ emission amount included in the acquired electric power information is below a predetermined threshold value (step S180). If the HV-ECU 140B determines that the $CO_2$ emission amount is below the threshold value (YES in step S180), the HV-ECU 140B outputs to the motive power output device 110 a command to input the commercial electric power supplied from the charging station 30 and charge the electricity storage device B, so that in the motive power output device 110, the charging control of the electricity storage device B is executed (step S190).

On the other hand, if the HV-ECU 140B determines that the $CO_2$ emission amount is greater than or equal to the threshold value (NO in step S180), the HV-ECU 140B ends the process without outputting to the motive power output device 110 the command to execute the charging control, and the process returns to the main routine.

During the execution of the charging control, the HV-ECU 140B determines whether or not to end the charging of the electricity storage device B on the basis of the state of charge (SOC) of the electricity storage device B (step S200). If the HV-ECU 140B determines that the charging of the electricity storage device B should continue (NO in step S200), the HV-ECU 140B returns the process to step S190, and continues the charging control.

On the other hand, if it is determined in step S200 that the charging of the electricity storage device B should end (YES in step S200), the HV-ECU 140B calculates the external charge $CO_2$ amount on the basis of the amount of charge from the charging station 30 and the electric power information acquired from the electric power information server 50A (step S210). Then, the HV-ECU 140B stores the amount of charge from the charging station 30 and the external charge $CO_2$ amount into the storage portion 144 (step S220).

Figure 14:
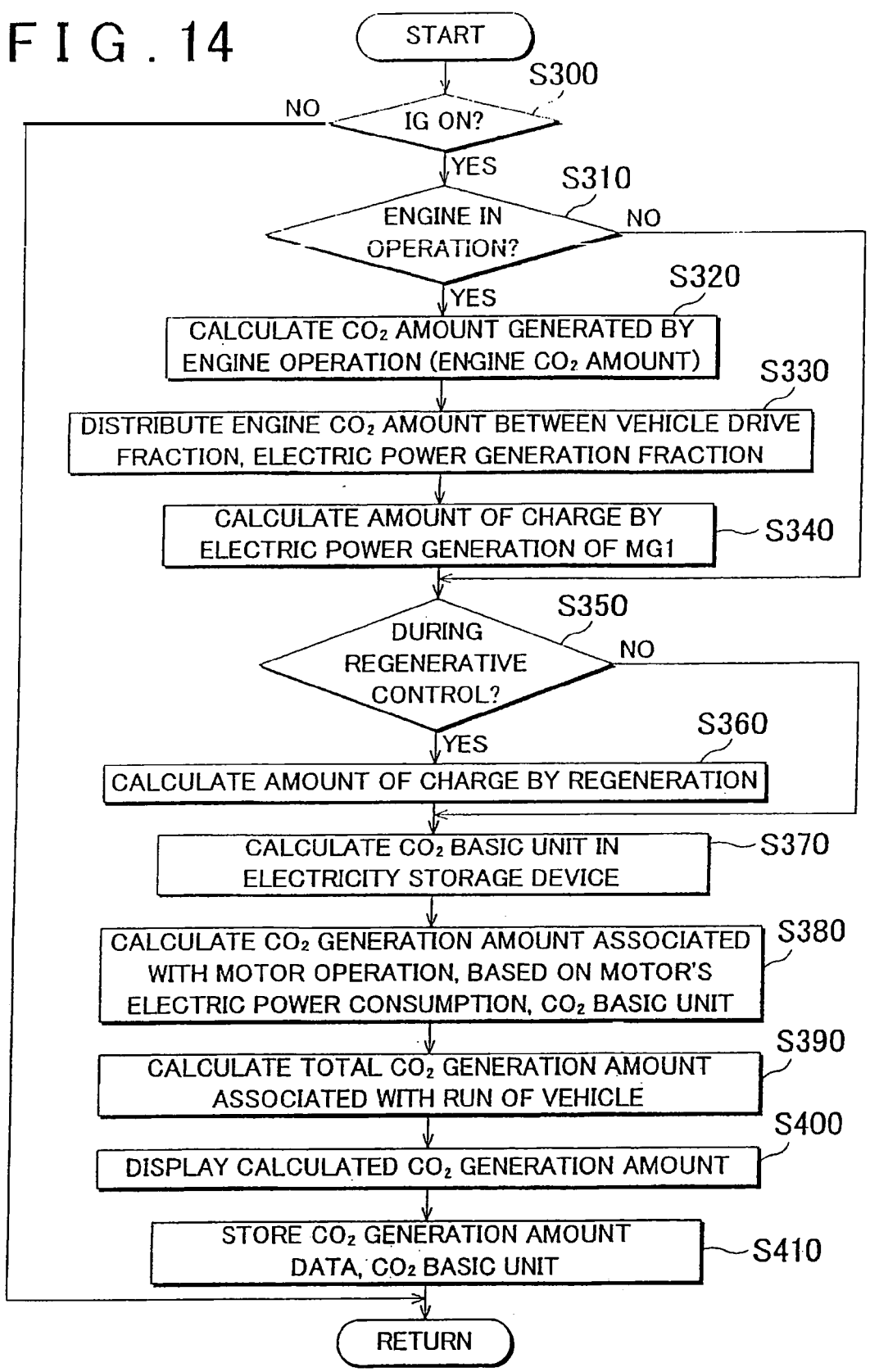
FIG. 14 is a flowchart of a calculation process of $CO_2$ emission amount performed by the HV-ECU that is included in the electric vehicle shown in FIG. 11.

FIG. 14 is a flowchart of a calculation process of the $CO_2$ emission amount by the HV-ECU included in the electric vehicle 40B shown in FIG. 11. Incidentally, the process shown in this flowchart is also called up from the main routine and executed at every certain time or when a predetermined condition holds.

Referring to FIG. 14, the HV-ECU 140B determines whether or not the signal IG that shows the presence/absence of activation of the electric vehicle 40B is in an on-state (step S300). If the HV-ECU 140B determines that the signal IG is in an off-state (NO in step S300), the HV-ECU 140B returns the process to the main routine without executing the subsequent series of process steps.

If it is determined in step S300 that the signal is in the on-state (YES in step S300), the HV-ECU 140B determines whether or not the engine 304 is in operation (step S310). If the HV-ECU 140B determines that the engine 304 is at a stop (NO in step S310), the HV-ECU 140B proceeds to step S350 described below.

If it is determined in step S310 that the engine 304 is in operation (YES in step S310), the HV-ECU 140B calculates the $CO_2$ amount emitted from the engine (engine $CO_2$ amount) on the basis of the fuel consumption amount (step S320). Then, the HV-ECU 140B distributes the calculated engine $CO_2$ amount between the motor vehicle drive fraction and the fraction of power generation by the motor-generator MG1 on the basis of the ratio of distribution by the power distribution mechanism 303 (step S330). Furthermore, the HV-ECU 140B calculates the amount of charge of the electricity storage device B provided by the power generation of the motor-generator MG1 (step S340).

Subsequently, the HV-ECU 140B determines whether or not the electric vehicle 40B is performing the regenerative braking (step S350). If the HV-ECU 140B determines that that the electric vehicle 40B is not performing the regenerative braking (NO in step S350), the HV-ECU 140B proceeds to step S370. If it is determined in step S350 that the electric vehicle 40B is performing the regenerative braking (YES in step S350), the HV-ECU 140B calculates the amount of charge of the electricity storage device B provided by the regenerative power generation of the motor-generator MG2 (step S360).

Subsequently, the HV-ECU 140B reads from the storage portion 144 the amount of charge of the electricity storage device occurring prior to the charging from the charging station 30 and the carry-over $CO_2$ amount as well as the amount of charge from the charging station 30 and the external charge $CO_2$ amount, and then calculates the $CO_2$ basic unit of electric power stored in the electricity storage device B by the above-described method, by further using the calculated engine $CO_2$ amount and the amount of charge by the power generation of the motor-generator MG1 as well as the amount of charge by the regenerative power generation of the motor-generator MG2 (step S370).

Then, the HV-ECU 140B calculates the $CO_2$ amount having been emitted in obtaining the motor vehicle driving power by the motor-generator MG2, on the basis of the electric power consumption of the motor-generators MG and the calculated $CO_2$ basic unit (step S380). Subsequently, the HV-ECU 140B calculates the total emission amount of $CO_2$ associated with the running of the motor vehicle by adding the motor vehicle drive fraction of the engine $CO_2$ amount to the $CO_2$ amount calculated in step S380 (step S390).

As the total emission amount of $CO_2$ associated with the running of the motor vehicle, the HV-ECU 140B calculates the following four pieces of data. That is, the HV-ECU 140B calculates the total emission amount of $CO_2$ from the start of the present run to the present time, and the cumulative $CO_2$ emission amount from the start of the use of the motor vehicle to the present time. The cumulative $CO_2$ emission amount can be calculated by integrating the total emission amounts of $CO_2$ of the individual trips. Besides, the HV-ECU 140B calculates the $CO_2$ emission amount per travel distance obtained by dividing the total emission amount of $CO_2$ from the start of the present run to the present time by the travel distance from the start of the present run to the present time, and the $CO_2$ emission amount per travel distance obtained by dividing the cumulative $CO_2$ emission amount by the cumulative travel distance to the present time.

Then, the HV-ECU 140B displays the calculated data of the $CO_2$ emission amounts in the display portion 142 (step S400).

Figure 15:
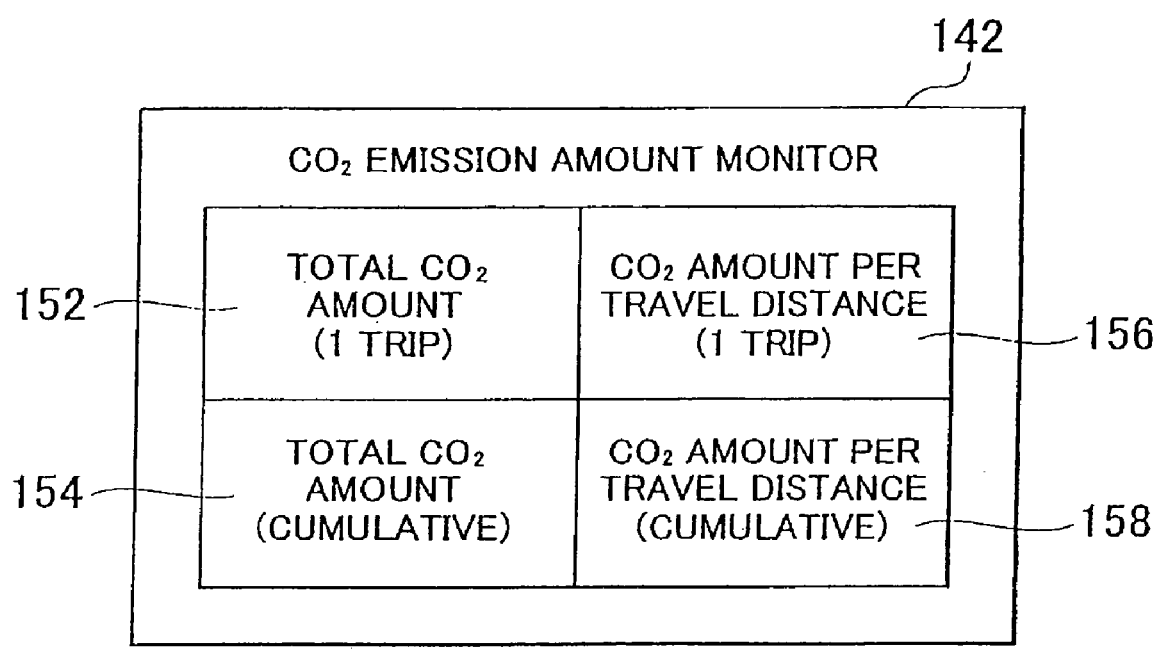
FIG. 15 is a diagram showing an initial screen of a display portion that is included in the electric vehicle shown in FIG. 11.

FIG. 15 is a diagram showing a process screen of the display portion included in the electric vehicle 40B shown in FIG. 11. Referring to FIG. 15, the display portion 142 is made of, for example, a touch panel, and displays four regions that each allow the selection of display of a corresponding one of the aforementioned four kinds of $CO_2$ emission amounts. If the user touches a region 152, the display portion 142 displays the total emission amount of $CO_2$ from the start of the present run to the present time.

If the use touches a region 154, the display portion 142 displays the cumulative $CO_2$ emission amount from the start of the use of the motor vehicle to the present time. Furthermore, if the user touches a region 156, the display portion 142 displays the $CO_2$ emission amount per travel distance obtained through the division by the travel distance from the start of the present run to the present time. Still further, if the user touches a region 158, the display portion 142 displays the $CO_2$ emission amount per travel distance obtained by dividing the cumulative $CO_2$ emission amount by the cumulative travel distance up to the present time.

Referring again to FIG. 14, the HV-ECU 140B stores the data regarding the $CO_2$ emission amounts calculated in step S390 and the $CO_2$ basic unit calculated in step S370, into the storage portion 144 (step S410).

As described above, in the fourth embodiment, the $CO_2$ emission amounts associated with the running of the motor vehicle are calculated, and at the time of charging from the charging station 30, those calculated $CO_2$ emission amounts are transmitted to the electric power information server 50A, the terminal device 70 at the user's home, and the like, via the charging cable 34. Hence, according to the fourth embodiment, it becomes possible to manage the total emission amount of $CO_2$ associated with the running of the motor vehicle on a server outside the motor vehicle or the terminal device 70 at the user's home, etc., and to collect the total emission amounts of $CO_2$ associated with the running of motor vehicles in a server on the Internet (e.g., the electric power information server 50A) for competition with other people (vehicles) or the like. In consequence, further improvement of the users' environmental conservation awareness can be expected. Besides, there is no need to additionally provide a communication medium for transmitting the calculated $CO_2$ emission amount to an external device or the like outside the motor vehicle. Furthermore, since the calculated $CO_2$ emission amounts are displayed on the display portion 142, it is possible to motivate the user to drive in such a fashion as to curb the $CO_2$ emission amount.

Although in the foregoing embodiments, the electric power information includes the $CO_2$ emission amount itself, the information regarding the $CO_2$ emission amount itself may be replaced by information regarding the amount of carbon dioxide. For example, as shown in FIG. 7, the information regarding the $CO_2$ emission amount itself may be replaced by information regarding the proportions accounted for by the electric power generation methods in the commercial electric power. Then, at the side of the electric vehicle 40, 40A, the total $CO_2$ emission amount may be calculated by multiplying the proportions of the electric power generation methods by corresponding $CO_2$ emission amounts per unit electric power of the electric power generation methods.

Furthermore, as stated above, in the fire power generation in which electric power is generated by burning petroleum, a gas or the like, a particularly large amount of carbon dioxide is generated. Therefore, it is permissible that the electricity storage device B may be charged by inputting commercial electric power only when the proportion accounted for by the amount of power generated by the fire power generation in the commercial electric power is below a pre-set threshold value.

Furthermore, although in the foregoing embodiments, the electric vehicle 40, 40A receives electric power information via the electricity transmission line 20, the communication medium of the electric power information is not limited to the electricity transmission line 20, but may also be a wireless LAN or the like. Furthermore, the electric vehicle 40, 40A may have, as maps specific to individual seasons or individual time slots of day, the electric power information that fluctuates depending on seasons and individual time slots, and may download maps from electric power companies or the like at appropriate timing.

Furthermore, although in the foregoing embodiments, the HV-ECU 140 (140A) of the electric vehicle 40 (40A) judges whether or not to execute the charging with the commercial electric power, it may be judged by the charging station 30 whether or not to execute the charging. Specifically, it is permissible to adopt a construction in which, in the charging station 30, the electric power information is received by a modem or the like, and if the $CO_2$ emission amount is below a threshold value, the commercial electric power is output from the charging station 30 to the electric vehicle 40 (40A), and the charging control is performed in the electric vehicle 40 (40A) in accordance with the input of the commercial electric power. Furthermore, the charging station 30 may have electric power information as maps specific to individual seasons or individual time slots.

Although in the foregoing description, the electric vehicle is a so-called series/parallel type hybrid vehicle in which the power of the engine 304 is distributed between the motor-generator MG1 and the wheels 302 through the use of the power distribution mechanism 303, the invention is also applicable to a so-called series type hybrid vehicle in which the power of the engine 304 is used only for the electric power generation of the motor-generator MG1 and the driving power of the motor vehicle is generated by using only the motor-generator MG2.

Furthermore, in the foregoing description, the commercial electric power from the charging station 30 is given to neutral points N1, N2 of the motor-generators MG1, MG2, and the motor-generators MG1, MG2 and the inverters 320, 330 are used to charge the electricity storage device B. However, a charging-dedicated inverter for charging the electricity storage device B from the charging station 30 may be separately provided. According to the foregoing embodiments, however, since there is no need to separately provide a charging-dedicated inverter, cost reduction and weight reduction of the motor vehicle can be attained.

Furthermore, although in the foregoing description, each of the electric vehicles 40, 40A is a hybrid vehicle having a motor-generator and an engine as motive power sources, the range of application of this invention is not limited to such hybrid vehicles, but also includes electric vehicles not equipped with an engine, and fuel-cell vehicles equipped with a fuel cell and an electricity storage device that is chargeable through the use of commercial electric power.

Furthermore, although in the foregoing description, the display portion 142 is provided in an electric vehicle, it is also permissible to provide a display portion at the charging station 30 or in the terminal device 70 at one's home. In this case, as for the $CO_2$ emission amount included in the electric power information from the electric power information server 50, it is appropriate that the charging station 30 or the terminal device 70 receive electric power information from the electric power information server 50 and display the $CO_2$ emission amount. As for the total $CO_2$ emission amount in the second embodiment and the various data of the $CO_2$ emission amount in the fourth embodiment, it is appropriate to transmit it from the HV-ECU 140A through the use of the modem 130 to the charging station 30 or the terminal device 70 via the electric power lines LC4, LC5 and the electric power lines LC2, LC3. Furthermore, display portions may be provided at appropriate sites in the electric vehicle, the charging station 30 and the terminal device 70.

Besides, although in the foregoing description, the electric power source for charging the electricity storage device B of the electric vehicle from the charging station 30 is a system electric power source to which electric power is transmitted from the electricity transmission line 20, the electric power source may include a stationary type fuel cell or a solar cell installed in a dwelling house, or the like. Then, if the $CO_2$ emission amount that occurs at the time of power generation of each electric power source is transmitted as electric power information from the terminal device 70 at a user's home or the like to the electric vehicle via the charging cable 34, the external charge $CO_2$ amount described in conjunction with the fourth embodiment can be calculated.

Incidentally, in the foregoing description, the electric power input lines ACL1, ACL2 and the charge plug 170 can be regarded as an "electric power input portion" in this invention, and the motor-generators MG1, MG2, the inverters 320, 330, the voltage boost converter 310 and the control device 340 of the motive power output device 110 can be regarded as an "electric power supply portion" and a "voltage conversion portion" in this invention. Furthermore, the HV-ECUs 140, 140A, 140B each can be regarded as a "control portion" in this invention, and the modem 130 can be regarded as a "reception portion" and a "communication device" in this invention. Still further, the motor-generator MG1 can be regarded as an "electric motor" in this invention, and the engine 304 can be regarded as an "internal combustion engine" in this invention.

Then, the charge plug 170, the electric power input lines ACL1, ACL2, and the motor-generators MG1, MG2, the inverters 320, 330, the voltage boost converter 310 and the control device 340 that are included in the motive power output device 110 as well as the HV-ECUs 140, 140A, 140B can be regarded as "charging devices" in this invention.

It is to be understood that the embodiments disclosed herein are illustrative and not restrictive, in all respects. The scope of the invention is shown not by the foregoing description of the embodiments but by the claims for patent, and is intended to include all the modifications that are within the scope of the claims and the meaning and scope of equivalents.

The invention claimed is:

1. A charging device comprising:
   an electric power input portion that receives a commercial electric power supplied from a commercial electric power source;
   an electric power supply portion that supplies the commercial electric power input from the electric power input portion to an electricity storage device after converting the commercial electric power into such a state as to be able to charge the electricity storage device; and
   a control portion that controls charging of the electricity storage device by the electric power supply portion on a basis of information regarding an amount of carbon dioxide having been emitted in generating the commercial electric power.

2. The charging device according to claim 1, wherein the electric power supply portion is a voltage conversion portion constructed so as to be able to convert the commercial electric power input from the electric power input portion to a voltage level of the electricity storage device and charge the electricity storage device.

3. The charging device according to claim 2, further comprising a reception portion that receives the information regarding the amount of carbon dioxide which is transmitted via an electricity transmission line that transmits the commercial electric power.

4. The charging device according to claim 2, wherein the information includes the amount of carbon dioxide having been emitted in generating the commercial electric power, and the control portion, when the amount of carbon dioxide included in the information is below a pre-set threshold value, outputs a command to charge the electricity storage device to the voltage conversion portion.

5. The charging device according to claim 2, wherein, the control portion, when the amount of carbon dioxide included in the information is below a pre-set threshold value and a price of the commercial electric power is below a pre-set price, outputs a command to charge the electricity storage device to the voltage conversion portion.

6. The charging device according to claim 2,
   wherein the information includes a proportion accounted for by an electric power generated by a fire power generation in the commercial electric power, and
   wherein the control portion, when the proportion is below a pre-set threshold value, outputs a command to charge the electricity storage device to the voltage conversion portion.

7. A mobile object comprising a charging device according to claim 1.

8. An electric vehicle comprising:
   a chargeable-dischargeable electricity storage device;
   an electric motor that generates a driving power of the vehicle by using an electric power from the electricity storage device;
   an electric power input portion that receives a commercial electric power from a commercial electric power source;
   a voltage conversion portion constructed so as to be able to convert the commercial electric power input from the electric power input portion to a voltage level of the electricity storage device and charge the electricity storage device; and
   a control portion that controls charging of the electricity storage device by the electric power supply portion on a basis of information regarding an amount of carbon dioxide having been emitted in generating the commercial electric power.

9. The electric vehicle according to claim 8, wherein the electric power supply portion is a voltage conversion portion constructed so as to be able to convert the commercial electric power input from the electric power input portion to a voltage level of the electricity storage device and charge the electricity storage device.

10. The electric vehicle according to claim 9, further comprising an internal combustion engine that operates as a motive power source of the vehicle,
    wherein the control portion calculates an amount of carbon dioxide that the internal combustion engine emits.

11. The electric vehicle according to claim 8, further comprising a storage portion that stores information regarding the amount of carbon dioxide,
    wherein the control portion further calculates a total emission amount of carbon dioxide on a basis of the information regarding the amount of carbon dioxide stored in the storage portion.

12. The electric vehicle according to claim 8, wherein the control portion further calculates a first amount of carbon dioxide having been emitted in obtaining a vehicle driving power by the electric motor on a basis of an electric power consumption amount of the electric motor and a basic unit that represents the amount of carbon dioxide having been emitted in generating a unit amount of the electric power stored in the electricity storage device.

13. The electric vehicle according to claim 12, further comprising an internal combustion engine that operates as a motive power source of the vehicle,
    wherein the control portion further calculates a second amount of carbon dioxide that the internal combustion engine emits, and calculates a total emission amount of carbon dioxide by adding the calculated second amount of carbon dioxide to the first amount of carbon dioxide.

14. The electric vehicle according to claim 13, further comprising a communication device constructed so as to be able to communicate with an external device or the like outside the vehicle via the electric power input portion,
    wherein when the electricity storage device is charged from the commercial electric power source, the communication device receives information regarding the amount of carbon dioxide transmitted from the external device or the like outside the vehicle via the electric power input portion, and transmits the total emission amount of carbon dioxide calculated by the control portion to the external device or the like outside the vehicle via the electric power input portion.

15. The electric vehicle according to claim 13, further comprising a indicating portion that indicates the total emission amount of carbon dioxide calculated by the control portion.

16. A charging control method comprising:
    judging whether or not it is appropriate to charge an electricity storage device with commercial electric power on a basis of information regarding an amount of carbon dioxide having been emitted in generating the commercial electric power; and
    converting the commercial electric power into such a state as to be able to charge the electricity storage device, when it is judged that it is appropriate to charge the electricity storage device with the commercial electric power.

17. A charging control method of an electric vehicle equipped with an electric motor that generates a driving power of the vehicle by using an electric power from a chargeable-rechargeable electricity storage device, characterized by comprising:

judging whether or not it is appropriate to charge the electricity storage device with commercial electric power on a basis of information regarding an amount of carbon dioxide having been emitted in generating the commercial electric power; and converting the commercial electric power into such a state as to be able to charge the electricity storage device, when it is judged that it is appropriate to charge the electricity storage device with the commercial electric power.

* * * * *